US005881409A

United States Patent [19]
Pearce

[11] Patent Number: 5,881,409
[45] Date of Patent: Mar. 16, 1999

[54] PUFF-QUILTED BLADDERS FOR CONTAINING FLOWABLE CUSHIONING MEDIUM

[75] Inventor: Tony M. Pearce, Alpine, Utah

[73] Assignee: TekSource, LL, Draper, Utah

[21] Appl. No.: 724,764

[22] Filed: Oct. 3, 1996

Related U.S. Application Data

[63] Continuation-in-part of Ser. No. 555,365, Nov. 8, 1995, abandoned, which is a continuation-in-part of Ser. No. 472,011, Jun. 5, 1995, Pat. No. 5,549,743, which is a continuation-in-part of Ser. No. 81,467, Jun. 22, 1993, Pat. No. 5,421,874, which is a continuation-in-part of Ser. No. 701,427, Aug. 22, 1996, Pat. No. 5,626,657.

[51] Int. Cl.$^6$ .................................................. A61G 7/057
[52] U.S. Cl. ................................ 5/702; 5/655.4; 5/654; 5/712
[58] Field of Search ........................... 5/702, 654, 655.4, 5/655.5, 909, 911, 668, 691, 710, 712, 420, 502, 709

[56] References Cited

U.S. PATENT DOCUMENTS

| | | | |
|---|---|---|---|
| 1,228,783 | 6/1917 | Kerivan . | |
| 2,491,557 | 12/1949 | Goolsbee | 5/348 |
| 2,655,369 | 10/1953 | Musilli | 267/1 |
| 2,672,183 | 3/1954 | Forsyth | 155/179 |
| 2,814,053 | 11/1957 | Sevcik | 5/348 |
| 3,407,406 | 10/1968 | Werner et al. | 2/3 |
| 3,459,179 | 8/1969 | Olesen | 128/60 |
| 3,462,778 | 8/1969 | Whitney | 5/347 |
| 3,518,786 | 7/1970 | Holtvoigt | 46/24 |
| 3,529,368 | 9/1970 | Canfield | 36/2.5 |
| 3,552,044 | 1/1971 | Wiele | 36/71 |
| 3,605,145 | 9/1971 | Graebe | 5/348 |
| 3,748,669 | 7/1973 | Warner | 5/348 |
| 3,748,779 | 7/1973 | Cherk et al. | 46/115 |
| 3,801,265 | 4/1974 | McGrew | 5/348 |
| 3,801,420 | 4/1974 | Anderson . | |
| 3,870,265 | 3/1975 | Graebe | 425/93 |
| 3,893,198 | 7/1975 | Blair | 5/345 |
| 3,968,530 | 7/1976 | Dyson | 5/348 |
| 3,986,213 | 10/1976 | Lynch | 3/36 |
| 4,038,762 | 8/1977 | Swan, Jr. | 36/89 |
| 4,083,127 | 4/1978 | Hanson | 36/93 |
| 4,144,658 | 3/1979 | Swan, Jr. | 36/117 |
| 4,163,297 | 8/1979 | Neumark | 5/446 |
| 4,229,546 | 10/1980 | Swan, Jr. | 521/55 |
| 4,243,754 | 1/1981 | Swan, Jr. | 521/55 |
| 4,247,963 | 2/1981 | Reddi | 5/450 |

(List continued on next page.)

FOREIGN PATENT DOCUMENTS

| | | | |
|---|---|---|---|
| 0 614 622 A1 | 9/1994 | European Pat. Off. | A43B 5/04 |
| 1106958 | 3/1968 | United Kingdom | A43B 5/04 |
| 1261475 | 1/1972 | United Kingdom | A47C 27/00 |
| 2 150 431 | 7/1985 | United Kingdom | A47C 27/08 |
| WO 91/04290 | 4/1991 | WIPO | C08J 9/22 |
| WO 92/14387 | 9/1992 | WIPO | A47C 7/42 |
| WO 96/39065 | 12/1996 | WIPO | A47C 4/54 |
| WO 97/17001 | 5/1997 | WIPO | A47C 27/12 |

*Primary Examiner*—Michael F. Trettel
*Attorney, Agent, or Firm*—Daniel McCarthy; Mark G. Sandbaker; Brick G. Power

[57] ABSTRACT

A bladder for containing a cushioning medium. The bladder includes open compartments which are created by welding or otherwise fastening a first bladder wall against a second bladder wall. The periphery of the bladder walls are welded or otherwise sealed together so that the bladder will contain a cushioning medium without leaking. The bladder is partially filled with cushioning medium so that it will be able to conform to the shape of a cushioned object and create a desired hammocking effect. The bladder is otherwise permanently attached to a base that is smaller than the bladder in at least one direction, resulting in a bladder which has loose skin and which has numerous random folds and creases on its skin. The base is a substantially non-stretchable fabric or other attachable non-stretch material. The cushioning medium is preferred to be lightly lubricated microspheres.

76 Claims, 8 Drawing Sheets

U.S. PATENT DOCUMENTS

| Patent No. | Date | Inventor | Class |
|---|---|---|---|
| 4,252,910 | 2/1981 | Schaefer | 521/145 |
| 4,255,202 | 3/1981 | Swan, Jr. | 106/122 |
| 4,256,304 | 3/1981 | Smith et al. | 273/232 |
| 4,274,169 | 6/1981 | Standiford | 5/502 |
| 4,279,044 | 7/1981 | Douglas | 5/453 |
| 4,292,701 | 10/1981 | Woychick | 5/422 |
| 4,335,476 | 6/1982 | Watkin | 5/464 |
| 4,335,478 | 6/1982 | Watkin | 5/740 |
| 4,369,284 | 1/1983 | Chen | 524/476 |
| 4,370,769 | 2/1983 | Herzig et al. | 5/452 |
| 4,422,194 | 12/1983 | Viesturs et al. | 5/451 |
| 4,467,053 | 8/1984 | Maride | 521/128 |
| 4,472,847 | 9/1984 | Gammons et al. | 5/453 |
| 4,483,029 | 11/1984 | Paul | 5/453 |
| 4,485,505 | 12/1984 | Paul | 5/453 |
| 4,485,568 | 12/1984 | Landi et al. | 36/44 |
| 4,498,205 | 2/1985 | Hino | 5/449 |
| 4,541,136 | 9/1985 | Graebe | 5/456 |
| 4,572,174 | 2/1986 | Eilender et al. | 128/149 |
| 4,588,229 | 5/1986 | Jay | 297/459 |
| 4,618,213 | 10/1986 | Chen | 350/96.34 |
| 4,628,557 | 12/1986 | Murphy | 5/446 |
| 4,660,238 | 4/1987 | Jay | 5/431 |
| 4,686,724 | 8/1987 | Bedford | 5/724 |
| 4,698,864 | 10/1987 | Graebe | 5/441 |
| 4,709,431 | 12/1987 | Shaktman | 5/481 |
| 4,713,854 | 12/1987 | Graebe | 5/481 |
| 4,726,624 | 2/1988 | Jay | 297/459 |
| 4,728,551 | 3/1988 | Jay | 428/76 |
| 4,737,998 | 4/1988 | Johnson, Sr. | 5/422 |
| 4,744,564 | 5/1988 | Yamada | 273/232 |
| 4,761,843 | 8/1988 | Jay | 5/431 |
| 4,842,330 | 6/1989 | Jay | 297/4 |
| 4,913,755 | 4/1990 | Grim | 156/145 |
| 4,945,588 | 8/1990 | Cassidy et al. | 5/451 |
| 4,952,190 | 8/1990 | Tarnoff et al. | 446/267 |
| 4,952,439 | 8/1990 | Hanson | 428/72 |
| 4,953,913 | 9/1990 | Graebe | 297/459 |
| 4,959,059 | 9/1990 | Eilender et al. | 604/358 |
| 5,010,608 | 4/1991 | Barnett et al. | 5/453 |
| 5,013,518 | 5/1991 | Gilroy et al. | 5/453 |
| 5,015,313 | 5/1991 | Drew et al. | 156/87 |
| 5,018,790 | 5/1991 | Jay | 297/459 |
| 5,020,176 | 6/1991 | Dotson | 5/453 |
| 5,027,801 | 7/1991 | Grim | 128/80 H |
| 5,039,567 | 8/1991 | Landi et al. | 428/116 |
| 5,052,068 | 10/1991 | Graebe | 5/455 |
| 5,053,436 | 10/1991 | Delgado | 521/64 |
| 5,058,291 | 10/1991 | Hanson | 36/117 |
| 5,074,620 | 12/1991 | Jay et al. | 297/337 |
| 5,079,786 | 1/1992 | Rojas | 5/450 |
| 5,079,787 | 1/1992 | Pollman | 5/450 |
| 5,093,138 | 3/1992 | Drew et al. | 426/68 |
| 5,093,139 | 3/1992 | Drew et al. | 426/68 |
| 5,100,712 | 3/1992 | Drew et al. | 428/68 |
| 5,103,518 | 4/1992 | Gilroy et al. | 5/453 |
| 5,111,544 | 5/1992 | Graebe | 5/470 |
| 5,147,685 | 9/1992 | Hanson | 428/189 |
| 5,147,686 | 9/1992 | Hanson | 428/189 |
| 5,149,173 | 9/1992 | Jay et al. | 297/284.9 |
| 5,152,023 | 10/1992 | Graebe | 5/455 |
| 5,163,196 | 11/1992 | Graebe et al. | 5/654 |
| 5,171,766 | 12/1992 | Mariano et al. | 523/218 |
| 5,180,619 | 1/1993 | Landi et al. | 428/116 |
| 5,190,504 | 3/1993 | Scatterday | 482/49 |
| 5,191,752 | 3/1993 | Murphy | 54/44.5 |
| 5,201,780 | 4/1993 | Dinsmoor, III et al. | 5/455 |
| 5,203,607 | 4/1993 | Landi . | |
| 5,204,154 | 4/1993 | Drew et al. | 428/68 |
| 5,211,446 | 5/1993 | Jay et al. | 297/444 |
| 5,224,863 | 7/1993 | Lauer et al. | 434/267 |
| 5,255,404 | 10/1993 | Dinsmoor, III et al. | 5/451 |
| 5,262,468 | 11/1993 | Chen | 524/476 |
| 5,282,286 | 2/1994 | MacLeish | 5/654 |
| 5,289,878 | 3/1994 | Landi et al. | 168/14 |
| 5,314,735 | 5/1994 | Aiken | 428/116 |
| 5,330,249 | 7/1994 | Weber et al. | 297/214 |
| 5,334,646 | 8/1994 | Chen | 524/474 |
| 5,334,696 | 8/1994 | Olson et al. | 528/322 |
| 5,335,907 | 8/1994 | Spector | 273/58 |
| 5,336,708 | 8/1994 | Chen | 524/474 |
| 5,352,023 | 10/1994 | Jay et al. | 297/452.21 |
| 5,360,653 | 11/1994 | Ackley | 428/71 |
| 5,362,834 | 11/1994 | Schapel et al. | 528/58 |
| 5,369,828 | 12/1994 | Graebe | 5/654 |
| 5,403,642 | 4/1995 | Landi et al. | 428/116 |
| 5,421,874 | 6/1995 | Pearce | 5/911 X |
| 5,429,852 | 7/1995 | Quinn | 428/71 |
| 5,444,881 | 8/1995 | Landi et al. | 5/653 |
| 5,445,861 | 8/1995 | Newton et al. | 428/116 |
| 5,456,072 | 10/1995 | Stern | 54/44.5 |
| 5,490,299 | 2/1996 | Dinsmour, III et al. | 5/654 |
| 5,496,610 | 3/1996 | Landi et al. | 428/116 |
| 5,508,334 | 4/1996 | Chen | 524/474 |
| 5,549,743 | 8/1996 | Pearce | 106/122 |
| 5,557,723 | 9/1996 | DiResta et al. | 273/58 H |
| 5,592,706 | 1/1997 | Pearce | 5/654 |
| 5,617,595 | 4/1997 | Landi et al. | 5/428 |
| 5,626,657 | 5/1997 | Pearce | 5/644 X |
| 5,636,395 | 6/1997 | Serda | 5/909 X |
| 5,689,845 | 11/1997 | Sobieralski et al. | 5/654 |

PUFF-QUILTED BLADDERS FOR CONTAINING FLOWABLE CUSHIONING MEDIUM

CONTINUITY

This application is a continuation-in-part of U.S. patent application Ser. No. 08/555,365, filed Nov. 8, 1995, now abandoned, which is a continuation-in-part of U.S. patent application Ser. No. 08/472,011, filed Jun. 5, 1995, now U.S. Pat. No. 5,549,743, which is a continuation-in-part of U.S. patent application Ser. No. 08/081,467, filed Jun. 22, 1993, now U.S. Pat. No. 5,421,874, and priority is claimed thereto for all of the material disclosed either explicitly or inherently therein; priority is also claimed to co-pending U.S. patent application Ser. No. 08/701,427, filed Aug. 22, 1996, now U.S. Pat. No. 5,626,657 which is a continuation-in-part of U.S. patent application Ser. No. 08/472,011, filed Jun. 5, 1995, now U.S. Pat. No. 5,549,743, which is a continuation-in-part of U.S. patent application Ser. No. 08/081,467, filed Jun. 5, 1995, now U.S. Pat. No. 5,421,874 for all of the material disclosed either explicitly or inherently therein.

I. BACKGROUND OF THE INVENTION

A. Field of the Invention

This invention relates to the field of bladders for cushions which contain flowable cushioning medium. More particularly, this invention relates to a bladder for a cushion, the bladder containing flowable cushioning medium, and the bladder having spot welds which are through-sewn to a base which is smaller in surface area than the bladder itself.

B. The Background Art

There are many types of cushions in the prior art which contain flowable cushioning media. Such cushions, if designed correctly, have the excellent properties of overall pressure reduction and pressure equalization across the cushion. This is achieved because the flowable medium, which is always contained in one or more bladders, flows under the cushioning pressure to reshape itself to the object being cushioned. This creates a greater total surface area being cushioned (to reduce overall pressure) and equalizes pressure across the cushioned object's surface (reducing or eliminating pressure peaks at protruding portions of the cushioned object).

In all effective prior art cushions which contain flowable media, the bladder which contains the media is oversized such that it is only filled to a portion of its capacity. This results in loose bladder skin, allowing the pliable bladder to move with the flowing media in conforming to the cushioned object. Bladders that do not have loose skin prevent the media from freely reshaping, thus harming the cushioning capability of the cushion.

The typical prior art means of achieving loose skin is as follows. A flat bladder is created by welding plastic films together around the edge of the bladder (edge weld) and at certain locations within the interior of the flat bladder (spot welds). The bladder is filled to partial capacity with a fluid material and the fill port is sealed. The bladder is then "scrunched up" (i.e. compacted by creating random folds and creases on the bladder surface) by (1) adhering portions of it via hook and loop to a base which is smaller than the fully extended partially filled bladder; (2) stuffing the bladder into an open-faced cavity which is smaller than the fully extended partially filled bladder; or (3) a combination of 1 and 2. By constraining the bladder into an area which is smaller than the fully extended size, the bladder skin becomes wrinkled and loose. The problem with (1) is that hook and loop can too easily separate, or the hook or loop side can loose its adherence to the plastic film, and is thus not secure. Further, hook and loop is expensive both to procure and to apply. Even further, the user of the cushion may become confused when reassembling the cushion, and assemble it with the wrong hook areas attached to certain loop areas, etc., or may not center the hook areas on the loop areas properly, resulting in a cushion which is sloppy in appearance or has lost some of its functionality. The problem with (2) above is that the tray adds to the expense of the cushion. Further, any cavity rigid enough to contain the bladder under the cushioning pressure creates the risk of contacting the object being cushioned and creating pressure peaks. To prevent this contact, the cushioned object (e.g., a person) must be located in a precise location, and is not free to move or be moved around. This reduces the desirability of a cushion, particularly to a person that desires to move around on the cushion. Further, the cavity adds weight to the cushion. Still further, it is difficult to control the location of various parts of the bladder relative to various parts of the cavity, and a cushion with sloppy appearance is created.

Another method for obtaining loose skin is described and claimed in my co-pending U.S. patent application Ser. No. 08/149,224, now U.S. Pat. No. 5,592,706, which is hereby incorporated by reference in its entirety. In brief, this includes the use of an elastomeric bladder which may be filled about 33% full with a flowable cushioning medium, although the bladder could be filled 10% to 95% of its volumetric capacity with flowable cushioning medium. A flowable cushioning medium used with that invention consists of lightly lubricated microspheres. This method of obtaining a loose bladder skin has the problems mentioned above related to hook and loop, or in the case of our current design, which puts individual bladders into a complex multi-cell fabric enclosure, adds substantial cost due to the sewing of the complex fabric. In any event, the use of many small bladders as opposed to one large bladder adds a great deal of cost because each bladder must be welded, trimmed, filled, and sealed.

Another prior art method for obtaining loose skin is described in U.S. Pat. Nos. 5,201,780 and 5,255,404, each of which is hereby incorporated by reference in its entirety. This method includes a large flat bladder segmented by welds, each segment being filled to partial capacity with a fluid. The bladder is stuffed into crevices in a piece of foam that is smaller than the fully-extended but partially filled bladder, which results in desirable wrinkles and loose skin (i.e. random folding and creasing of the bladder skin). The problem with this method is that the fluid is constrained to stay in each segment and cannot freely flow throughout the cushion, thus limiting the degree of shaping of the cushion to conform to the shape of the cushioned object, and of the opportunity for the cushioned object to sinking into the cushion. The problem with this method is solved with the invention disclosed in U.S. patent application Ser. No. 08/149,224, now U.S. Pat. No. 5,592,706, by using cells of various sizes to pre-shape the cushion. The users of the method of the '780 and '404 patents try to compensate for its deficiencies by placing each segment atop a piece of foam, which allows more deformation than would be permitted without the foam. However, this is labor-intensive and does not result in a reliable product because the adhesive or hook and loop means used to locate each segment could separate. Another problem with this method is that the foam will break down over time, reducing the effectiveness of the cushion and making the cushion appear sloppier.

Another method of obtaining loose skin in fluid-filled cushion bladders is to mold the bladders in three dimensions instead of using flat bladders. For examples of this, the reader is directed to U.S. Pat. Nos. 5,163,196, 5,052,068, 4,698,864, 5,111,544, 5,369,828, 4,713,854, and 3,605,145, each of which is incorporated by reference herein in its entirety. Such molding, vacuum forming, or pressure forming, however, is significantly more expensive than welding of flat films as in the other methods described above.

Accordingly, due to the various deficiencies in the prior art there is a need for a cushion bladder which has any combination of the following features listed below.

Other art which the reader should be aware of includes U.S. Pat. Nos. 4,485,505, 4,572,174, 4,498,205, 4,483,029, 4,247,963, 4,255,404, 3,893,198, 3,605,145, 2,814,053, 1,261,475, 5,163,196, 5,052,068, 4,698,864, 5,111,544, 5,369,828, 5,190,504, 5,335,907, 4,952,190, 3,748,779, 4,744,564, 3,518,786, 4,256,304, 5,204,154, 5,201,780, 5,147,685, 5,100,712, 5,093,138, 5,079,787, 5,079,786, 5,074,620, 5,058,291, 5,018,790, 5,015,313, 4,953,313, 4,952,439, 4,842,330, 4,761,843, 4,728,551, 4,726,624, 4,709,431, 4,467,053, 4,660,238, 4,588,229, 4,255,202, 4,243,754, 4,252,910, 4,229,546, 4,144,658, 4,083,127, 4,038,762, 3,986,213, 3,968,530, 3,748,669, 3,552,044, 3,529,368, 3,407,406, 5,103,518, 5,020,176, 5,010,608, 4,945,588, 4,292,701, 4,472,847, 3,462,778, 4,628,557, 2,672,183, 1,228,783, 5,421,874, 3,459,179, 4,163,297, 4,737,998, 2,491,557, 2,655,369, 4,713,854, 5,255,404, and 4,959,059, each of which is hereby incorporated by reference in its entirety. This art relates generally to the field of cushions, cushioning medium or seats and may be helpful to the reader in understanding the status of the art before the invention was made.

II. SUMMARY OF THE INVENTION

It is an object of the invention to provide a bladder that has features selected from the following: (1) a loose, pliable bladder skin to enable deformation of the bladder to match the contours of the cushioned object, enabling the fluid within the bladder to reshape itself to those contours; (2) low cost to manufacture the bladder; (3) a bladder constructed from flat materials via welding; (4) durable connections between the bladder and a base which is smaller than the bladder itself, the smallness of the base in comparison with the bladder causing the bladder to have a loose skin; (5) a bladder that allows the cushioned object to move around or be relocated on the cushion without risk of contacting a three-dimensional relatively rigid object (such as a hard base), thus compromising cushioning function; (6) a bladder that does not require the user of the cushion to make decisions about the location and sequence of connections to the base and therefore eliminates possible user confusion regarding assembly of the cushion; (7) a bladder that does not enable the user to apply connections to the base off-center, resulting in an improperly assembled bladder; (8) a bladder that in spite of deforming to the shape of the cushioned object, maintains a relatively neat and tidy appearance; (9) a bladder that allows flowable cushioning medium contained within it to flow throughout the cushion or throughout selected portions of the cushion without allowing the cushion to expand or balloon up excessively in any one place; (10) a bladder that is light weight; (11) a bladder that does not require the use of foam or other additional deforming agent(s) beneath the bladder to allow sufficient sinking in or reshaping (although foam could be used in combination with the invention if desired); (12) a bladder that is durable against puncture and wear; (13) a bladder that is supple and pliable; (14) a bladder that fully contains a desired cushioning medium.

These and other objects of the invention are accomplished by welding a flat bladder around its perimeter, then spot welding the bladder in selected places in its interior, usually at regular intervals. A non-stretch fabric that is cut to a shape similar to the bladder but smaller in at least one dimension than the partially-filled, sealed bladder is employed as a base. The bladder is sewn to the base by sewing through the spot welds and around the periphery of the bladder (or at select points around the periphery).

Because the base is smaller than the bladder, the bladder wrinkles and has loose skin (i.e. the bladder includes numerous desirable random folds and creases on the bladder skin), thereby allowing deformation and permitting the bladder to conform to the shape of a cushioned object.

If the spot welds are regularly spaced, the cushion has a tidy puff-quilted appearance, similar to the quilted appearance of some bedding materials and some garments. This permits the bladder to maintain an attractive appearance even when it is cushioning an object. The sewing of the spot welds and periphery positively locates the bladder relative to the non-stretch base, creating a durable product that does not lose functionality due to improper reassembly as in the prior art. There is no rigid cavity to create risk of contact or to prevent moving around. The fluid is free to move around the spot welds throughout the cushion or selected portions of the cushion, allowing maximum conformity of the bladder to the shape of a cushioned object.

The distance between spot welds can be regulated to control undesirable ballooning of the bladder in any given location. Labor cost associated with welding and sewing is low.

The bladder is light weight since it uses thin fabrics and films. A cover may be used which encompasses or encloses the puff-quilted bladder. In addition to a cover, other cushion components may be used to meet the unique requirements of the particular cushion.

These and other objects, features and advantages of the invention will become apparent to persons of ordinary skill in the art upon reading the specification in conjunction with the accompanying drawings.

III. BRIEF DESCRIPTION OF THE DRAWINGS

FIG. 1b is a side view of the bladder of FIG. 1a.

IV. DESCRIPTION OF THE PREFERRED EMBODIMENTS

A. Configuration of the Puff-Quilt

Figure 1A:
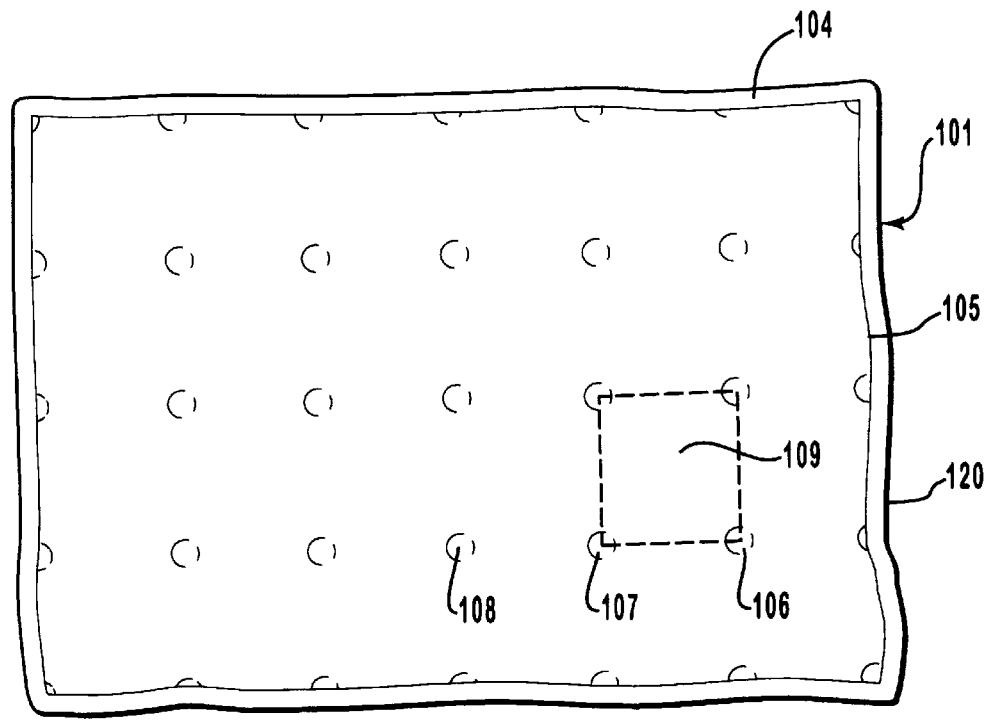
FIG. 1a is a top or plan view of a flat empty bladder created by welding of two or more films around their entire periphery or border and at specific locations within their interiors.
Figure 1B:
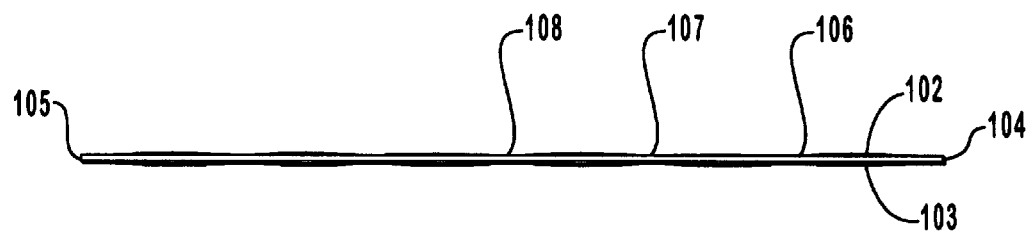

Referring to the Figures, a preferred welded bladder 101 of the invention is depicted. FIG. 1a shows a preferred welded bladder. The bladder 101 includes a first bladder layer 102 and a second bladder layer 103 which are assembled as described to create a bladder capable of containing a cushioning medium in the preferred configuration. First bladder layer 102 and second bladder are preferably flat sheets of a flexible bladder material. The first bladder layer 102 and the second bladder layer 103 each have an exterior border or periphery 104 and 105. It is preferred to weld first bladder layer 102 and second bladder layer 103 together about their exterior borders or peripheries 104 and 105 to create a bladder capable of containing a cushioning medium. That welding alone, however, simply creates a bag or enclosure.

Next, it is desired to spot weld the first and second bladder layers 102 and 103 together as shown in the figures with representative spot welds 106, 107 and 108. Use of the spot welds create open compartments such as 109. The open compartments will each contain some cushioning medium, and the open compartments will permit cushioning medium to flow among each other in order to maximize ability of the cushion to conform to the shape of a cushioned object.

Figure 1C:
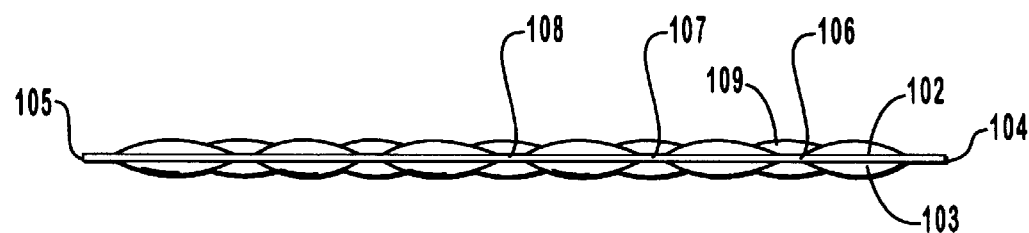
FIG. 1c is a side view of the bladder of FIG. 1b after cushioning medium has been placed into the bladder.

Next, it is desired to partially fill the bladder with a flowable cushioning medium, as depicted in FIG. 1c. The flowable cushioning medium can be any of the cushioning medium indicated below or any prior art flowable cushioning medium.

Once the cushion has been partially filled with cushioning medium, the bladder 101 is sewn to a base 110. Note that in FIG. 1a, some excess fabric 120 is shown beyond the periphery 105 (the periphery having a weld), the excess fabric being useful for sewing or otherwise attaching the bladder to a base 110. It is preferred to sew the bladder to the base both around the periphery by use of the excess fabric 120 and through the spot welds. If linear or other welds are used instead of the spot welds depicted in the figures, then the bladder would be sewn or otherwise attached to the base through such welds.

Figure 1D:
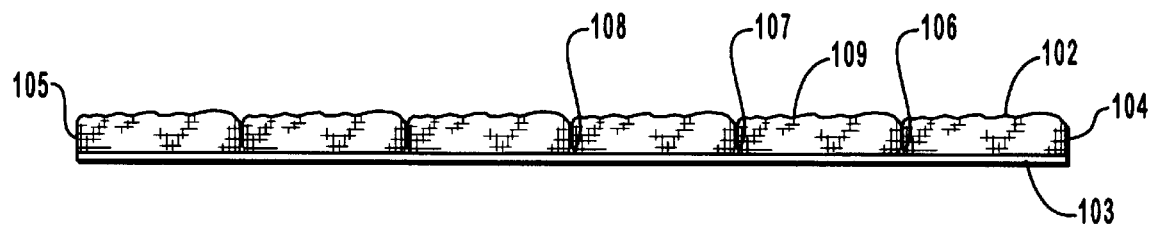
FIG. 1d is a side view of the bladder of FIG. 1c after the bladder has been sewn to a base that is generally the same shape as the bladder but is smaller than the bladder in at least one dimension.
Figure 1E:
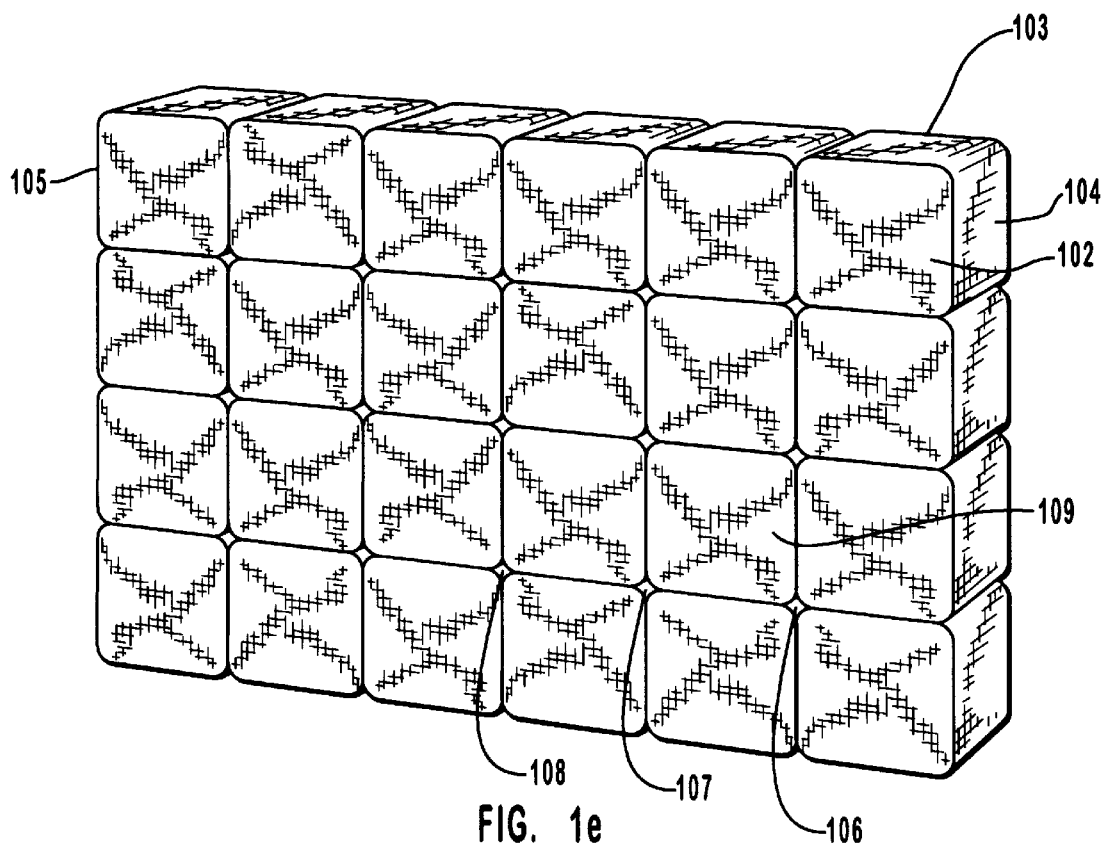
FIG. 1e is a perspective view of the bladder of FIG. 1d, illustrating the puff-quilted appearance and the wrinkled or loose skin resulting when a bladder is assembled as described.

The base 110 is preferably the same shape or a similar shape as the bladder 101, but is smaller than the bladder in at least one dimension. The preferred base 110 is a non-stretchable fabric. Following sewing of the bladder to the base, the sewing taking place preferably through the interior welds and through the excess fabric just outside of the periphery weld, a completed cushion as depicted in FIGS. 1d and 1e is the result. This cushion, while simple in structure and inexpensive to manufacture, yields a cushion that is very effective at distributing cushioning forces across the surface area of the object being cushioned. It also permits mobility of the object being cushioned, and achieves the various other objects of the invention listed above.

It should be noted that the base can be smaller than the bladder in all directions, in only one direction, or in any combination in between and still achieve the loose skin that is desired and the resulting cushioning function. Also, rectangular, square or other shaped bladders and bases may be utilized. For example, in a rectangular cushion, the base might be 1.5 times smaller than the bladder in the lengthwise direction, but have the same width as the bladder. This would result in a cushion that has bar-shaped (i.e. rectangular) puffs, rather than square puffs.

The preferred bladder depicted in the figures has a weld all around its periphery, plus circular spot welds at various regular internal locations, plus half-circle and quarter-circle welds around the periphery. The circle, half-circle, and quarter-circle spot welds provide sufficient surface area through which to sew to the base without risking sewing through the fluid-filled portion of the bladder. This preferred configuration allows sewing at all the spot welds.

In another preferred embodiment of the invention, the bladder is sewn to the base all the way around the periphery rather than just at the half- and quarter-circle spot welds. In that case, when the bladder is trimmed after welding, some excess fabric would be left outside the periphery weld for sewing. These preferred embodiments work well for square or rectangular cushions. However, the cushion can be of any shape, including circular, oval, rounded rectangle, octagonal, hexagonal, or of irregular shape and incorporate these inventive features.

In the preferred embodiment of the invention, the base 110 is of the same shape as the bladder 101, but of reduced size. However, some difference in shape between base and bladder can used to achieve special shaping, appearance, or functionality. Also, the bladder can extend in any direction beyond the portion of the base that is to be sewn to.

In the preferred bladder, the base is 30% to 40% smaller than the bladder when empty. However, the base could be any reasonably smaller size, such as 5% to 95% smaller. The smaller the base relative to the bladder, the looser and more wrinkly the skin will be on the bladder (i.e. the bladder will have a greater number of random folds and creases on its skin). A goal of cushions containing flowable cushioning medium is for the skin of the bladder containing the flowable cushioning medium to be loose enough to deform to the cushioned object's shape, but then, as the object continues to sink in (i.e. as the bladder conforms to the cushioned object's shape), to become tight-skinned (causing the object to "hammock" before hitting the base). This goal is achieved when a base smaller in dimension than the bladder is used.

The preferred fluid fill level of the bladder, prior to sewing to the base, is 30% to 40% of the bladder's volumetric capacity. However, any fill level less than 100% is intended to be encompassed within the inventive concept. The fulfillment of the cushioning goal in the previous paragraph is obtained by balancing the degree of loose skin on the bladder with the fill level of the bladder, so many combinations are possible.

The sewing of the bladder to the base in the preferred embodiment is done at corresponding locations within the same-shaped base. For example, a left upper corner of the bladder would be sewn to a left upper corner of the base. As another example, a spot weld at the center of the bladder would be sewn to the center of the base. However, the exact location of sewing to the base may be varied to a degree to achieve special shaping, appearance, or functionality.

Sewing is the preferred form of attachment, but any non-removable fastener through the weld and the base may be used in the invention. Rivets are the second most preferred form of attachment, and there are many other means. The key is that the attachment is not removable (at least without destructive means), and is strong enough to withstand the rigors through which the cushion is put. Welding, stapling or other attachments may be used. As a group, such attachments and their equivalents are referred to herein simply as attachments.

The base of the preferred embodiment is a flat, relatively non-stretch fabric. The base may be roughly the same shape as, but smaller than the bladder, or it may be smaller than the bladder in only one dimension, in which case the shape is preferably similar to that of the bladder, but scaled in one direction. Or the base may be smaller than the bladder in more than one dimension. Any two-dimensional or three-dimensional base that is suitably shaped and can be attached to the bladder (such as by sewing) is suitable for use in the invention. For example, in a wheelchair cushion, a fabric may be sewn around a shaped plastic plate which provides positioning of the legs and hips of the wheelchair user. This creates a three-dimensional base. The bladder would then be sewn to the top fabric of the three-dimensional base and the objects of the invention would be achieved while the additional functionality of leg and hip positioning would be provided.

In the preferred embodiment, the flowable cushioning medium is able to travel throughout the bladder from open compartment to open compartment between the spot welds. However, the cushion may consist of one large bladder which is segmented. Only one of the segments need have the features of the invention in order to be considered within the scope of the invention.

The bladder/base combination (hereafter "puff-quilt") may be the complete cushion, or may be part of a more comprehensive assembly. For example, a cover may be used over the puff-quilt. As another example, the puff-quilt may be placed next to other cushioning or object positioning mechanisms such as lumbar supports or leg positioners, all within a cover. Thus, the invention may be a sub-assembly of a more complex device.

The objects of the invention are met in part in the following ways: (1) A loose bladder skin is formed by forcing the bladder to assume less than its fully extended shape via sewing it to a base that is smaller than the bladder in at least one dimension. (2) The bladder is low cost because it consists of welding of flat pieces and sewing, both of which are low cost operations, and does not use a complex structure. (3) The connections between the bladder and the base formed by sewing or rivets are durable (i.e. sewing and riveting are much more likely to maintain their attachment than hook and loop fastening means. Further, since the attachments are permanent, there is no possibility of incorrect reassembly). (4) There is no rigid three-dimensional base as found in the prior art to cause possible contact with the cushioned object, and so the risk of improper cushioning is low and the cushioned object can be moved around and repositioned on the cushion without compromise. (5) When the cushioned object is removed, the cushion is tidy and attractive in appearance. The puff-quilted appearance of the invention is attractive even when deformed. The permanent connections between base and bladder ensure that the cushion does not become sloppy as would happen if hook and loop fasteners were not properly refastened. The regularly spaced spot welds of the preferred embodiment prevent any one place from ballooning up, further preventing an untidy or sloppy appearance. (6) In the preferred embodiment, the flowable cushioning medium is free to flow throughout the bladder around the spot welds through the open compartments without excessive expansion or ballooning, such being prevented by the spot welds. (7) The puff-quilt is light weight, consisting of thin films and fabrics. (8) Because the cushioning medium is free to flow throughout the bladder, and because the degree of deformation before hammocking is controllable through spot weld spacing and degree of relative smallness of the base compared to the bladder, the puff-quilt can be configured such that the use of foam or other additional deforming agent beneath the fluid bladder is not needed to allow sufficient sinking in or reshaping.

B. Materials of Construction of the Puff-Quilt

Figure 2:
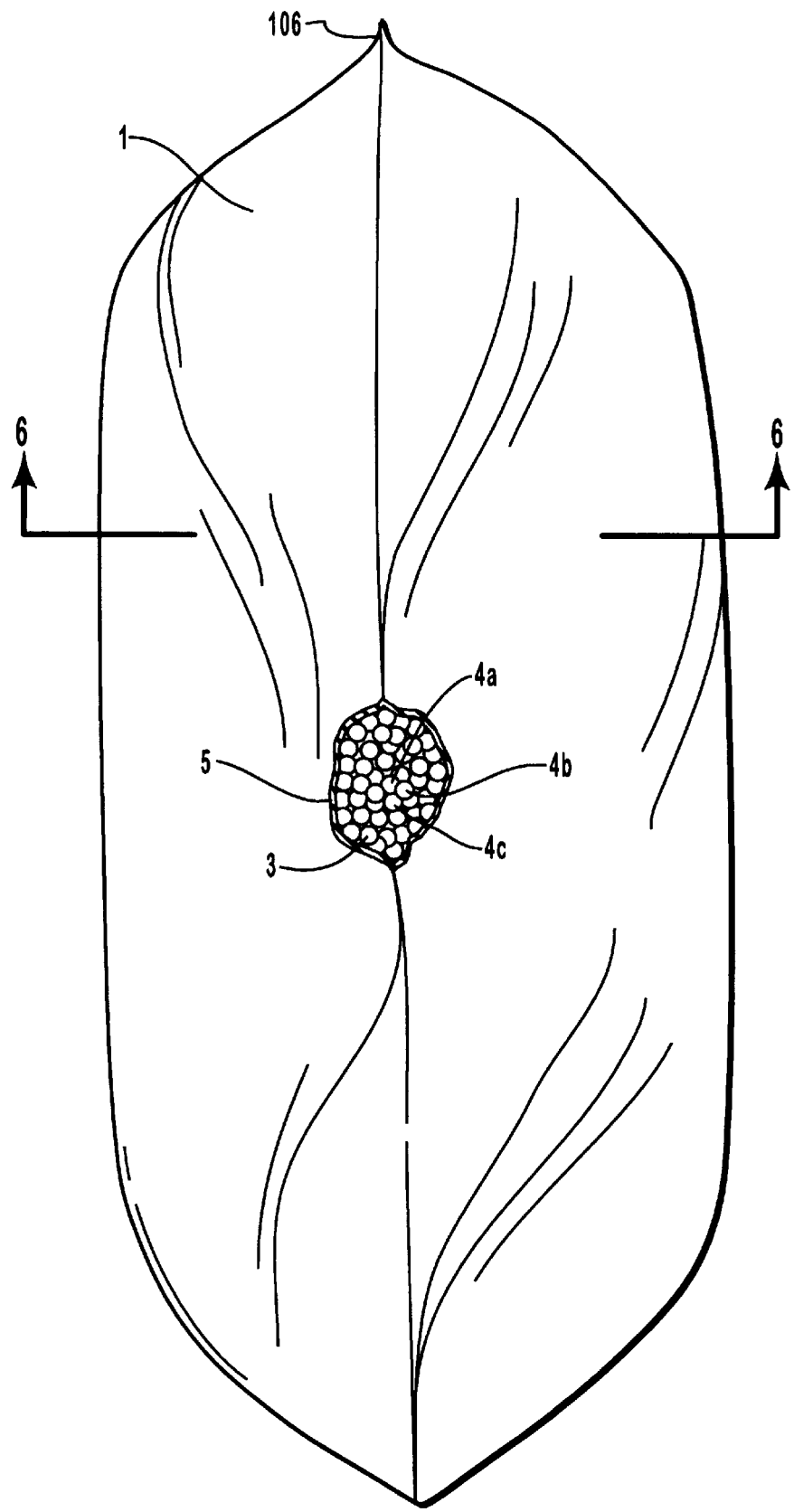
FIG. 2 depicts a preferred embodiment of the composite mixture preferred in the invention employed within a flexible bladder.

The preferred flowable cushioning medium and bladder used in the invention are as described below. The preferred flowable cushioning medium is a composite mixture. Referring to FIG. 2, one preferred embodiment of the preferred composite mixture disposed within a flexible bladder 1 is shown. The flexible bladder 1 has bladder walls 2a and 2b and serves as a mechanism for containing the composite mixture of the invention in flexible fluid-tight confinement. The bladder may have a seam 6 where it was sealed. Although the bladder walls 2a and 2b are flexible in the preferred embodiment, filling the bladder 1 to capacity with composite mixture would greatly reduce or eliminate possible movement of the bladder walls 2a and 2b and inhibit the cushioning effect of the invention.

In the center of the bladder 1 is shown a cut-away depicting the composite mixture 3 of the invention. The composite mixture 3 in the preferred embodiment of the invention has numerous spherical objects 4a, 4b and 4c thinly coated with a lubricant 5 to enable movement of the spherical objects 4a, 4b and 4c with respect to each other in all three dimensions by low-friction rolling and sliding. The amount of lubricant 5 used in the invention is a quantity sufficient to substantially coat the exterior surfaces of substantially all of the spherical objects 4a–c, but in a quantity less than would cause dispersion of the spherical objects 4a–c in lubricant 5 and less than sufficient to significantly physically separate the spherical objects 4a–c from each other. Thus, the composite mixture 3 is a quantity of spherical objects 4a–c which have slightly lubricated exterior surfaces so that they may move with respect to each other in low-friction sliding and rolling contact. The composite mixture is not a lubricant or other liquid which contains dispersed spherical objects within it.

The behavior of spherical objects 4a, 4b and 4c in the composite mixture 3 is similar to that of oiled ball bearings in sliding and rolling contact with each other, providing little resistance to movement in any direction. This permits the composite mixture 3 to deform in response to a deforming force, including any flowing or shearing movement of the composite mixture required to accommodate such deformation with little resistance. Because the composite mixture 3 is composed of lightly lubricated spherical objects (e.g. discrete solid particles) rather than being composed of a viscous liquid-like prior art fluid, the composite mixture does not have head pressure and has no tendency to return to its original shape after the removal of a deforming force, and, thus, has no memory.

Figure 3:
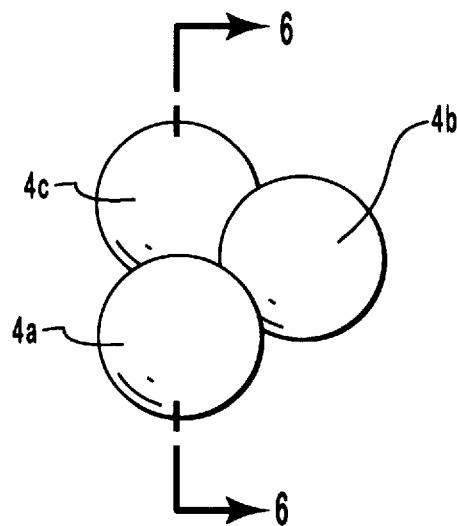
FIG. 3 depicts three spherical objects of the invention in rolling and sliding contact with each other.

FIG. 3 depicts three spherical objects 4a, 4b and 4c in sliding and rolling contact with each other. Use of perfect or nearly perfect spheres facilitates the most efficient and lowest friction movement of the spherical objects against each other, but imperfect shapes or even objects with flat or rough sides could be used. Any of the spherical objects 4a, 4b or 4c can easily roll and slide with respect to the other spherical objects as shown.

Figure 4:
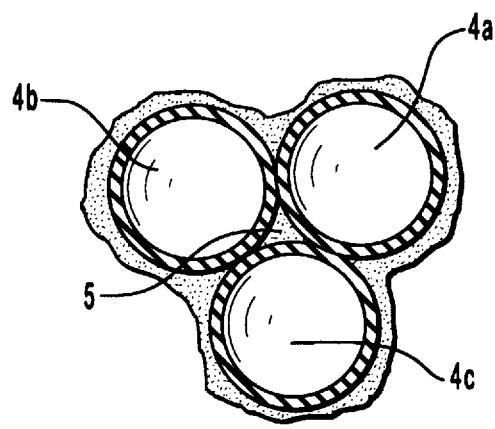
FIG. 4 depicts a cross-sectional view through line 6—6 of FIG. 3 of three spherical objects in rolling and sliding lubricated contact with each other.

FIG. 4 depicts a cross-sectional view of the spherical objects of FIG. 3 at 4—4. In the preferred embodiment depicted in FIG. 4, hollow spherical objects 4a, 4b and 4c are utilized and a lubricant 5 is present on the exterior surfaces of the spherical objects to further facilitate their movement relative to each other. The combination of low-friction spherical objects 4a, 4b, and 4c with a friction-reducing lubricant 5 facilitates very efficient movement of the spherical objects with respect to each other, offering little resistance to movement in any direction and achieving the desired flow and shear characteristics of the invention. The movement may be either from rolling or sliding of the spherical objects 4a, 4b and 4c with respect to each other.

Figure 5:
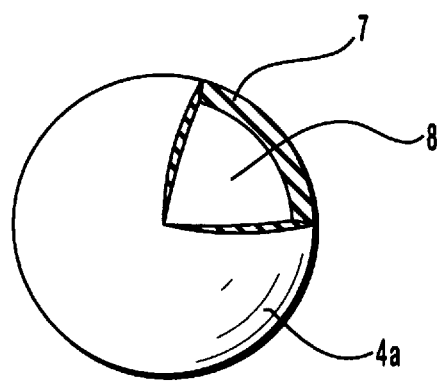
FIG. 5 depicts a partial section of a hollow spherical object.

FIG. 5 depicts a partial section of a spherical object 4a used in one preferred embodiment of the invention. Shown are the spherical object rigid outer shell 7 and spherical object interior 8. The spherical object 4a has an interior 8 that may be hollow, and the interior may be a vacuum or a gaseous interior. In alternative embodiments of the invention, spherical objects 4 which have liquid or solid interiors are used. The preferred embodiment of the invention utilizes spherical objects 4 with an inert gaseous atmosphere in their interiors 8. If a shell 7 of low density is used, the combination of shell 7 and hollow or gaseous interior 8 results in a spherical object 4 with a very low specific gravity.

The spherical objects 4a, 4b and 4c may be entirely spherical, oblong, egg-shaped, spherical with a flat spot, multi-sided such as octagonal, rough-sided or otherwise. Nearly perfect spherical shapes with smooth exteriors are preferred, although the ones mentioned above or others could be used as substitutes and are all collectively referred to herein as "spherical objects." As mentioned above, the spherical objects may be solid or hollow and may have gaseous, liquid or solid interiors, although gaseous interiors are used in the preferred embodiment. The specific gravity of the spherical objects used in the most preferred embodiment of the invention is no more than 0.02. In other embodiments of the invention, heavier walls or partially hollow interiors, such as a lattice interior or others, may be used, typically resulting in a greater specific gravity.

The spherical objects used in the preferred embodiment of the invention are microspheres which are commonly available commercially, having walls made of metal, glass, carbon, mineral, quartz, and/or plastic and having inert gaseous atmospheres sealed within their interiors. Microspheres of other materials would be suitable for use in the invention as well. In a more preferred embodiment of the invention, the microspheres are made of an acrylic or phenolic plastic. In the most preferred embodiment of the invention, the acrylic microspheres are PM 6545 available from PQ Corporation of Pennsylvania. In another most preferred embodiment of the invention, the microspheres may be unexpanded or expanded DE (091-80) phenolic microspheres from Expancel Inc. (Duluth, Ga.).

The interiors of the microspheres could be entirely hollow (i.e. having an interior vacuum) or could have gaseous, solid or liquid interiors. The microspheres typically have diameters less than 2000 microns. A common range of commercially available microsphere diameters is about 5 to about 200 microns.

In the preferred embodiment of the invention, the spherical objects used are plastic-walled microspheres with a diameter in the range of about 10 to about 200 microns. These microspheres have a specific gravity of about 0.02. Microspheres of other sizes could be used as well. For example, spherical objects of larger dimensions, such as 0.25 inches in diameter, could be employed, although the cushioning surface provided by such spherical objects would be bumpy rather than smooth. The microspheres used in the preferred embodiment of the invention are very small, as indicated above, and appear as fine dust to the naked eye, there being thousands of such microspheres per cubic inch. When lightly lubricated, the resultant composite mixture appears homogeneous.

In a preferred embodiment of the invention, the spherical objects have an elastic characteristic, such that the microspheres can be compressed to less than 20% of their original volume and rebound to about 100% of their original volume when the compressive force is removed. These microspheres are also resistant to a pressure of up to about 2,000 psi without rupturing. These characteristics add to the durability and cushioning effect of the composite mixture using such microspheres.

The lubricant 5 used in the invention may be any lubricant selected from the group consisting of oils, greases, silicone-based lubricants, vegetable-based lubricants, petroleum-based lubricants, mineral-based lubricants, water-based lubricants, synthetic lubricants, or any other friction-reducing substance. In one embodiment of the invention, the lubricant is a liquid soap or detergent. One such mixture which may be used is a bubble-blowing solution known as MR. BUBBLES, available from Tootsietoy, a division of Strombecker Corporation of Chicago, Ill. Another such detergent-type lubricant used in a preferred embodiment of the composite mixture is coco diethanolamide, a common ingredient in shampoos. Coco diethanolamide resists evaporation, is stable, relatively non-toxic, non-flammable, readily soluble in water without staining and does not support microbial growth. Coco diethanolamide provides a highly desirable level of friction reduction to permit the spherical objects of the invented composition to readily slide and roll in contact with each other. Many different soap or detergent compositions could be used as well, with a preference for more lubricious and sudsable mixtures.

In another embodiment of the invention, SUPREPULL WIRE AND CABLE PULLING LUBE WITH TEFLON, available from Synco Chemical Corporation of Bohemia, N.Y., is used. This is a water-based, non-toxic, odorless and non-flammable lubricant. In another embodiment of the invention, a lubricant comprising deionized water, propylene glycol, isopropanol, polyethylene oxide, and methylparaben is used. PERMATEX INDUSTRIAL SUPER LUBE MULTI-PURPOSE SYNTHETIC LUBRICANT WITH TEFLON which is commercially available from Permatex Industrial Corporation of Avon, Conn. may also be used.

The lubricant 5 of the invention may also be any lubricious visco-elastic fluid. The Applicant prefers the use of a visco-elastic fluid as the lubricant when maximum longevity of a cushioning product is desired, due to the tendency of visco-elastic fluids to resist bleeding through bladder walls. As used herein the term "visco-elastic fluid" is defined to mean that the faster the fluid is deformed, the stronger the tendency of the fluid to resist the deformation. The visco-elastic fluid of the preferred embodiment is a mixture of molecules which are reversibly cross-linked, such that the linkages between the molecules can be relatively easily sheared with a mechanical force. As used herein, the term "cross-linked" refers to any type of reversible intermolecular or intramolecular bonding, including, but not limited to, covalent as well as non-covalent interactions such as ionic, hydrophobic, hydrophilic, Van der Waals interactions and hydrogen bonding. Bonds formed by reversible cationic or anionic polymerization reactions are also intended to be comprehended within the scope of the term "cross-linked" as used herein.

The cross-linked linkages are most easily sheared by a slow mechanical force. A quick mechanical force will tend to move a large quantity of visco-elastic fluid due to the fluid's affinity for itself, but a slow mechanical force will tend to shear cross-linkages, resulting in the movement of only a small quantity of fluid.

After the cross-linked linkages are sheared with a mechanical force, such as by a person sitting on a seat cushion which includes microspheres and a visco-elastic fluid as a lubricant, the reversibility of the molecular bonds is facilitated if enough time is available for the free ends of the molecules to establish new bonds with other molecules that will help pull the molecules away from the molecules to which they were originally bonded. Thus, the visco-elastic fluid and the composite mixture itself, a reasonably short period of time after experiencing a mechanical force, reestablish cross-linking of the visco-elastic fluid.

Because the visco-elastic fluid (i.e. the lubricant) is extensively and reversibly bonded, the quantity of the visco-elastic fluid within a bladder essentially behaves as one large polymer. Thus, a given quantity of the visco-elastic fluid has a resistance to very rapid flow, but is readily deformable under a continual force and continually serves to lubricate the spherical objects when included in the invented composite mixture. In the most preferred embodiment of the invention, the visco-elastic fluid has an affinity for itself which resists forces that would cause the fluid to migrate through the walls of any container holding the composite mixture. This yields a result that solves a difficult problem of the prior art. The Applicant found that although suitable composite mixtures could be formulated, over time the lubricant of many composite mixtures tended to migrate through intermolecular spaces of the flexible bladder materials used by the Applicant. When a visco-elastic fluid is used, however, the visco-elastic fluid's affinity for itself, or in other words, its desire to behave as a single polymer, prevents the visco-elastic fluid from migrating through prior art bladder materials. The result is a composite mixture that can be retained within a thin, flexible bladder for very long periods of time.

The visco-elastic fluid may include a single compound or a mixture of compounds. The lubricant may be any visco-elastic fluid with sufficient lubricity to reduce the coefficient of friction between contacting spherical objects and not prevent sliding and rolling of said spherical objects with respect to each other. In a preferred embodiment, the visco-elastic fluid may include a principle molecule (such as a monomer or a polymer) and an intermediate molecule (a cross-linking agent). The principle molecule may include, but is not limited to, propylene similar chemicals. In another preferred embodiment, the principle molecule has lubricious characteristics before cross-linking. A suitable cross-linking agent is cationic acrylamide (sold under the trade name "MAGNIFLOC" by Cytec Industries of West Paterson, N.J.).

In the most preferred embodiment of the visco-elastic fluid of the invention, the principal molecule is white mineral oil and the intermediate molecule is an elastomeric polymer. The white mineral oil is preferably a USP (United States Pharmacopeia) grade sold under the trade name of SUPERLA White Mineral Oil No. 21 by Amoco Corporation of Chicago, Ill. The elastomeric polymer may be a random co-polymer, an alternating co-polymer or a block co-polymer. The elastomeric polymer is preferably a tri-block co-polymer having an A-B-A configuration. "A" preferably has a crystalline character; monoalkylarenes, of which polystyrene is an example, are preferred "A" blocks. "B" is preferably elastomeric; preferred "B" blocks include polyethylene/butylene, hydrogenated polyisoprene, hydrogenated polybutadiene and hydrogenated poly(isoprene+butadiene). The Applicant prefers tri-block co-polymers such as KRATON G 1651 (Shell Chemical Company, Houston, Tex.; or GLS Corp, Cary, Ill.) (poly(styrene-ethylene/butylene-styrene)) and SEPTON 8006 (Kuraray Co. Ltd., Isoprene Chemicals Division, Tokyo, Japan) (poly(styrene-ethylene/butylene-styrene)).

In a preferred embodiment of the invention, the lubricant may include a preservative. The preservative should be appropriate for the stabilization of the components of the lubricants. The preservative may inhibit microbial growth and/or stabilize the lubricant against oxidation or other chemical degradation. Any effective amount of preservative is within the scope of the invention. One example of preservatives is a preservative called DANTOGARD which is available from Lonza Corporation of Fair Lawn, N.J. A suitable antioxidant is Irganox 1010 (Ciba Geigy Corporation, Hawthorne, N.Y.). In the most preferred embodiment of the invention, the amount of preservative is not more than about 1 weight percent, based on the total weight of lubricant.

In one preferred embodiment of the visco-elastic fluid, the amount of principle molecule may range from about 99.99 to about 90 weight percent, and the amount of cross-linking agent may range from about 0.01 to about 10 weight percent, where the weight percent is based on the total weight of principle molecule (monomer or polymer) and cross-linking agent (intermediate molecule). In a most preferred embodiment of the visco-elastic fluid of the invention, the lubricant is about 98 to about 99.8 weight percent principle molecule and about 2 to about 0.2 weight percent cross-linking agent. Another most preferred embodiment uses about 97 weight percent propylene glycol (the principle molecule), about 2 weight percent cross-linking agent (the intermediate molecule), and about 1 weight percent preservative. Other most preferred embodiments of the visco-elastic fluid use about 98.8 weight percent glycerin (the principle molecule), about 0.2 weight percent cross-linking agent (the intermediate molecule) and about 1.0 weight percent preservative, or about 99.3 weight percent white mineral oil (the principle molecule) and about 0.7 weight percent elastomeric polymer (the intermediate molecule). In the broadest range contemplated by the Applicant, the principle molecule will be in the range of about 75 to about 99.99 weight percent, and the cross-linking agent will be in the range of about 0.01 to 25 weight percent.

The lubricant may also include a molecule which functions as both a principle molecule and a cross-linking agent. Such a lubricant may be a bifunctional reagent with functional groups for both receiving and forming cross-links.

FIGS. 7–10 illustrate examples of a visco-elastic fluid comprising a principle molecule and cross-linking agent or a bifunctional molecule. The representations of the principle molecule and cross-linking agent, and of the bifunctional molecule, are intended to be illustrative in nature, and do not reflect the actual molecular structure.

Figure 7:
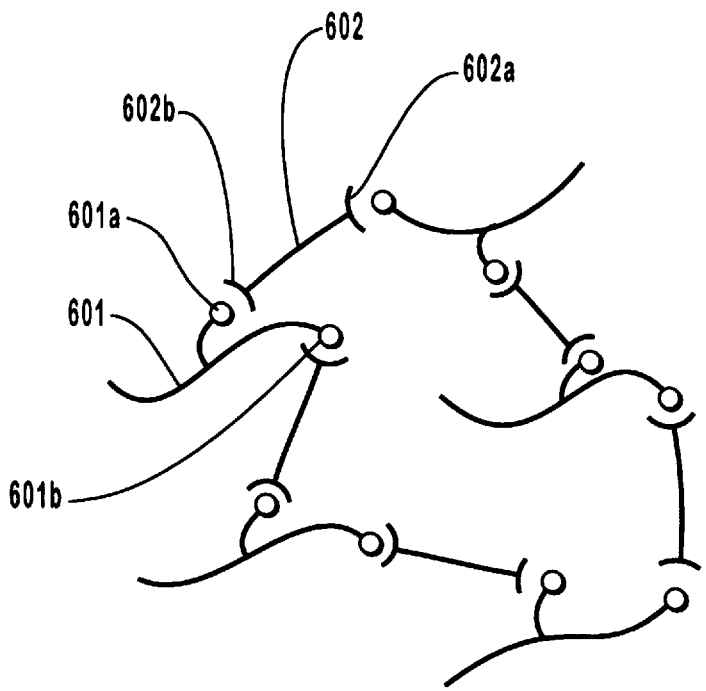
FIGS. 7–10 illustrate three different visco-elastic fluids.
Figure 8:
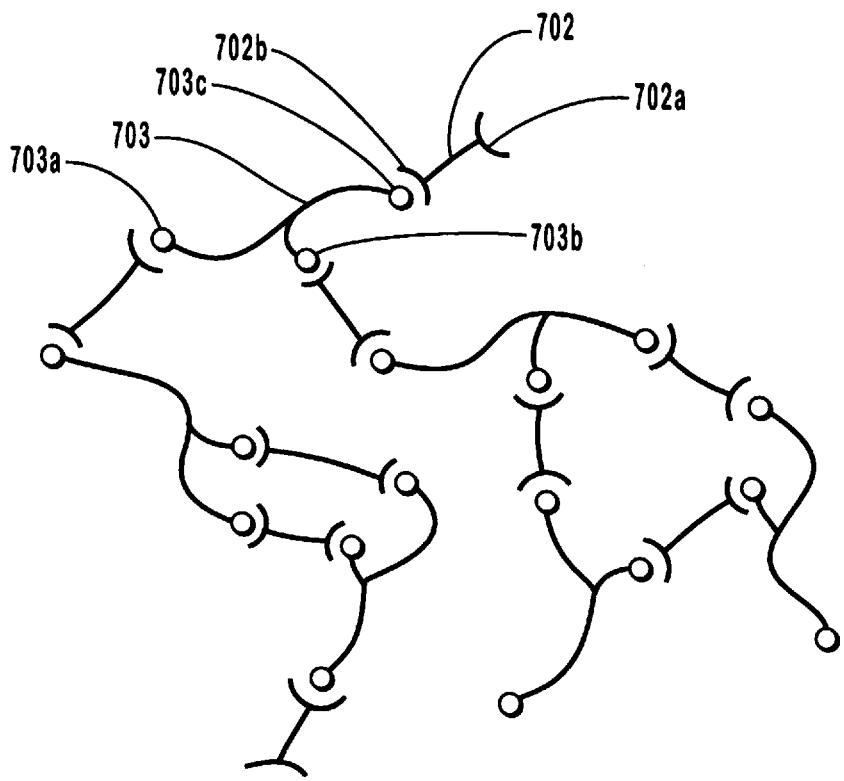

Referring to FIG. 7, an example of a cross-linked visco-elastic fluid is shown. In this example, principle molecule 601 contains two cross-linkable groups 601a and 601b. Cross-linking agent 602 also includes two active groups 602a and 602b, which can form reversible cross-links with groups 601a and 601b. Referring to FIG. 8, a principle molecule including more than two cross-linkable groups is within the scope of the invention. Principle molecule 703 includes three cross-linkable groups 703a, 703b and 703c. Groups 703a, 703b and 703c can form reversible cross-links with groups 702a and 702b on cross-linking agent 702. Cross-linking agents containing more functional groups are also within the scope of the invention.

Figure 9:
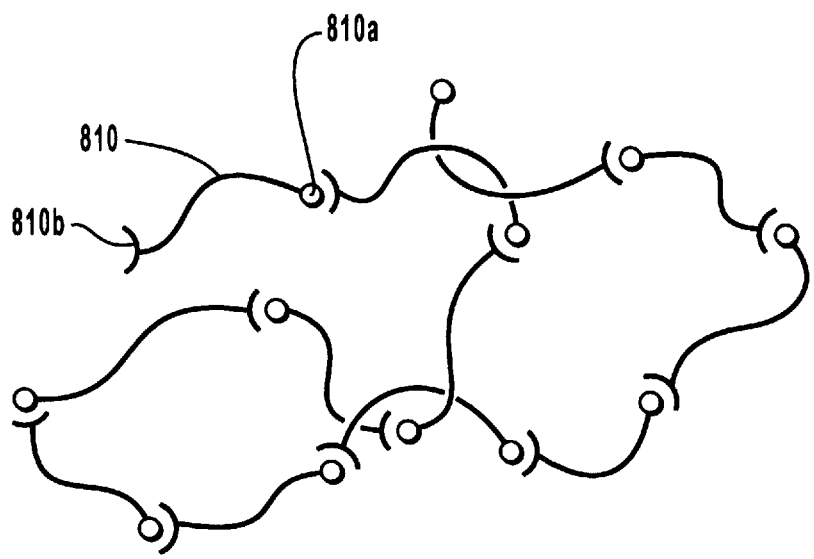
Figure 10:
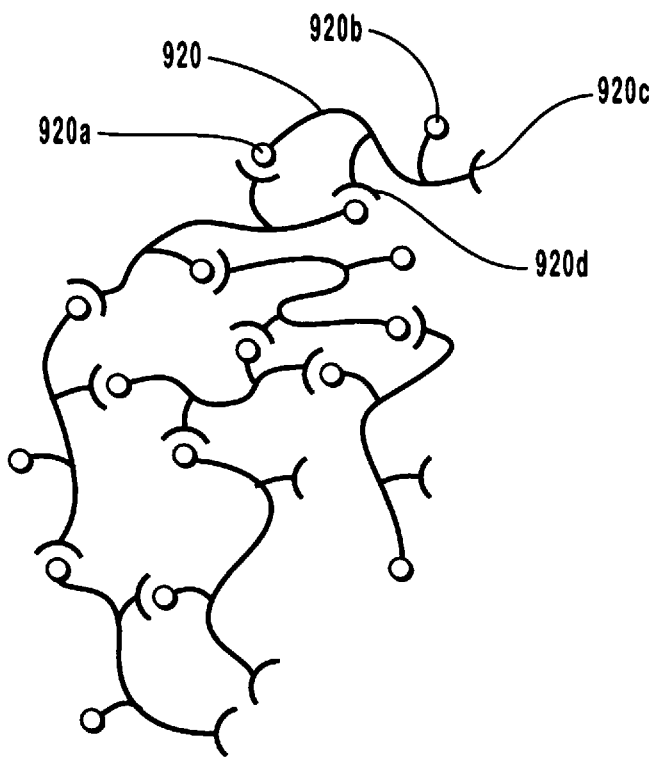

Referring to FIG. 9, a bi-functional visco-elastic fluid is also within the scope of the invention. For example, molecule 810 may include functional groups 810a and 810b, which are capable of forming reversible cross-links with other functional groups 810b and 810a, respectively. Referring to FIG. 10, it is also contemplated that a bifunctional molecule could have more than two functional groups. For the purposes of illustration, molecule 920 has four functional groups 920a, 920b, 920c and 920d, which are capable of forming reversible cross-links.

Figure 11A:
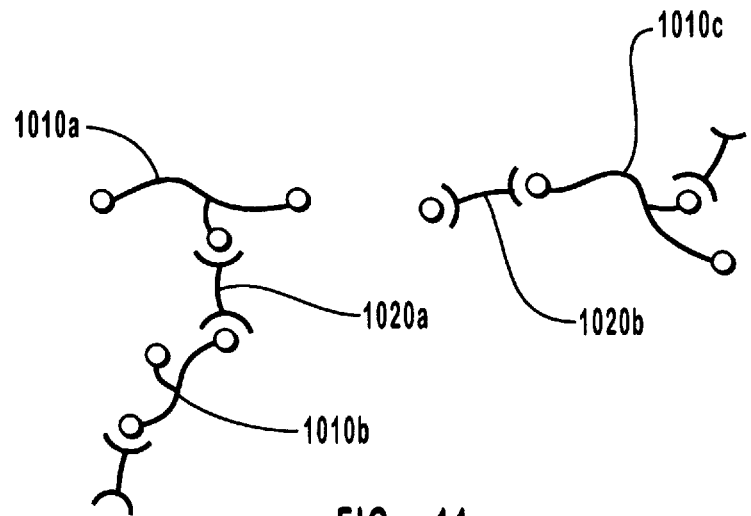
FIGS. 11a, 11b and 11c illustrate shearing and reformation of a visco-elastic fluid.
Figure 11B:
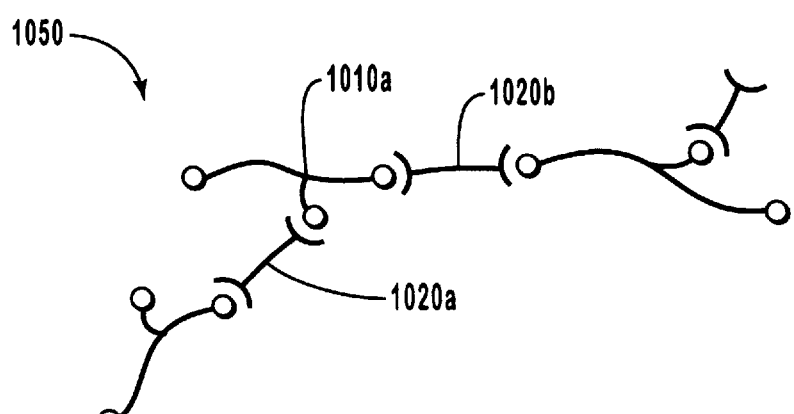
Figure 11C:
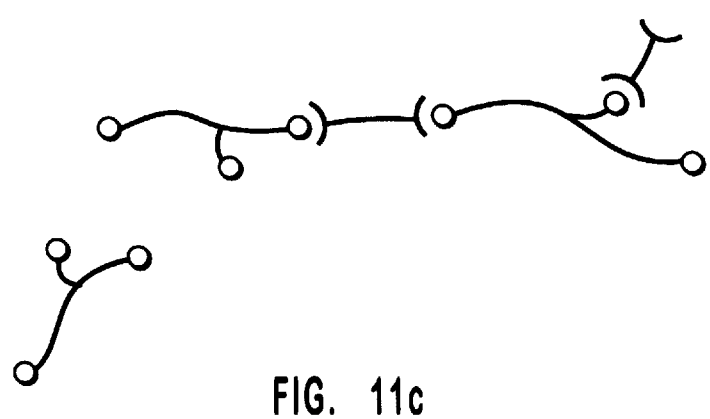

Referring to FIGS. 11a–c, an example of the shearing and reformation of reversible cross-links is shown. FIG. 11a shows a hypothetical ordering of principle molecules 1010 and cross-linking agents 1020. Referring to FIG. 11b, when a shear force 1050 is applied, principle molecule 1010a moves away from cross-linking agent 1020a and towards cross-linking agent 1020b. One of the functional groups of principle molecule 1010a forms a cross-link with cross-linking agent 1020b. Referring to FIG. 11c, the reversible cross-link between principle molecule 1010a and 1020a is then sheared. While this example illustrates the shearing and reformation of cross-links between principle molecules and cross-linking agents, the principles underlying these illustrations are also applicable to principle molecules and cross-linking agents containing different numbers of functional groups from those shown, and to bifunctional molecules.

If possible, the lubricant used should have a relatively low specific gravity and not be subject to degradation or break down over time. This helps the invention achieve its objects of being lightweight, durable, and not varying in performance with temperature. Preferably, the lubricant used will not be subject to substantial changes in lubriciousness in the range of ordinary outdoor temperatures (0 degrees to +120 degrees Fahrenheit). Many of the preferred lubricants described above exhibit this resistance to a change in lubriciousness. This avoids substantial variance in essential performance characteristics of the composite mixture with changes in temperature.

It is possible to broaden the lower end of the temperature range in which the invention is intended to function by adding a suitable antifreeze to the lubricant. Suitable antifreezes may include, but are not limited to, propylene glycol and ethylene glycol. In a preferred embodiment of the invention, the antifreeze is preferably non-toxic.

An important object of the lubricant is to facilitate low friction sliding and rolling contact of microspheres with each other to permit flow and shear of the composite mixture. It is not an object of the lubricant to disperse the microspheres in the lubricant and prevent contact of microspheres with each other. The quantity of lubricant required for such dispersion would make the composite mixture unduly heavy and would increase its coefficient of heat transfer and thermal mass due to the reduction of the amount of trapped gases in the form of microsphere interiors. Such a large amount of lubricant would also result in a composite mixture with head pressure and with a greater shear force than desired in the present invention. Therefore, the amount of lubricant used in the invention is a quantity sufficient to substantially coat the exterior surfaces of substantially all of the spherical objects, but in a quantity less than would cause dispersion of the spherical objects in the lubricant and less than sufficient to significantly physically separate the spherical objects from each other. The spherical objects would be considered significantly physically separated if the amount of lubricant provided allowed the spherical objects to float or move in the lubricant independent of each other rather than, as in the invention, continually being in sliding and rolling contact with each other with only a thin film of lubricant interposed between the spherical objects to facilitate their sliding and rolling contact.

The composite mixture of the invention deforms, flows or shears under light pressure but ceases to flow, shear or deform when the pressure is terminated. Prior art cushioning fluids typically continue to flow after pressure has been terminated, sometimes due to gravity and sometimes in an attempt to rebound to their original shape, thus being inferior in performance to the composite mixture of the present invention. Lubricants which impede rather than facilitate sliding and rolling movement of spherical objects with each other, such as stiff wax, would be undesirable because they would not achieve the objects of the invention. The lubricant need only serve to reduce the coefficient of friction of the spherical objects sliding and rolling with respect to each other.

The invention further includes a flexible bladder containing the composite mixture. The flexible bladder in the invention may be any flexible or pliable material in a variety of thicknesses. Suitable materials for the flexible bladder may include, but are not limited to, polyurethane, vinyl, other plastics, latex, rubber, synthetic rubbers, thermoplastic elastomers, EVA's, or any other thin, flexible, fluid impermeable or low-permeability film. The flexible bladder may have one or more layers of such materials disposed on either side of the composite mixture. In a preferred embodiment of the invention, the flexible bladder is fluid-tight, and thereby resists bleeding or evaporation of the lubricant through the walls of the bladder. In the most preferred embodiment of the invention, the flexible bladder is a laminated fabric comprising a woven fabric laminated to a thin, flexible, impermeable or low-permeability film. Such a woven fabric may include a stretchable, strong fabric such as a stretch-knit polyamide (such as that sold under the trade name "LYCRA" by DuPont corporation of Wilmington, Del., or PENN-NYLA by Penn-Nyla of Nottingham, England). In the best mode, the film is preferably a polyurethane film, such as an ether-based polyurethane film. Suitable ether-based polyurethane films include, but are not limited to, 6 mils and 10 mils film (Deerfield Urethane, Inc., a Miles Inc. Company, South Deerfield, Mich.; PS 3110 S and PT 9200 VS). A flexible bladder including a laminated fabric may be formed by various known methods of manufacturing or by attaching layers of fabric. Such methods may include, but are not limited to, laminating the fabric and film together using heat-welding, radio frequency welding or ultrasonic welding.

Figures 6, 6A:
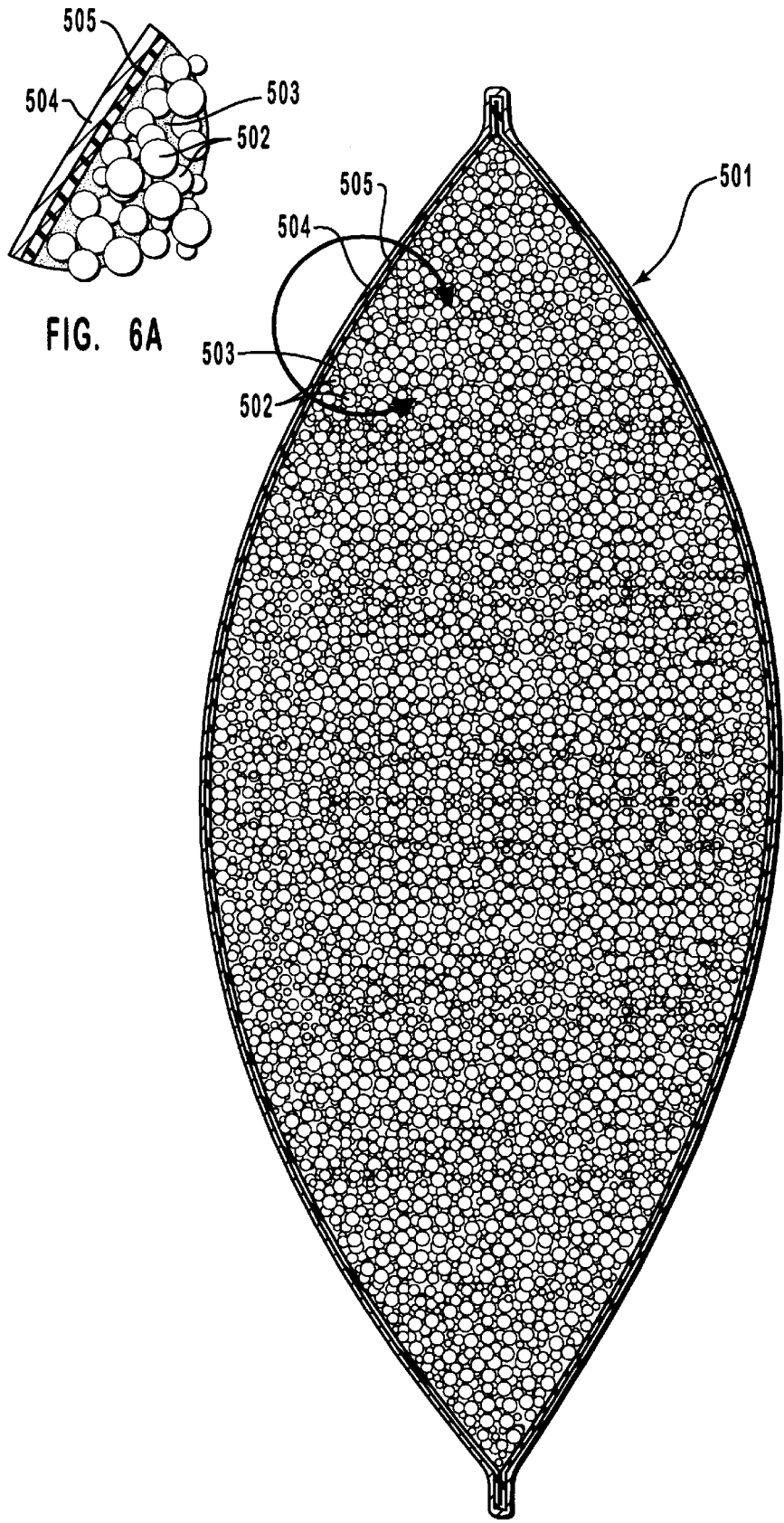
FIGS. 6 and 6A depict a cross section of the preferred bladder material of the invention in use containing a quantity of spherical objects which are lightly lubricated with a visco-elastic fluid.

Referring to FIGS. 6 and 6A, a preferred embodiment of the invented bladder 501 is shown containing a quantity of spherical objects 502 which are slightly lubricated with a quantity of visco-elastic fluid 503. The bladder 501 includes a first layer 504 of a stretchable fabric (such as a stretch-knit polyamide) laminated to a film (such as a polyester-based polyurethane or a polyether-based polyurethane). The film layer 504 is disposed toward the fluid 503 and spherical object 502 mixture, and the fabric layer 504 is disposed toward the exterior of the cushion. A bladder formed from a stretchable fabric laminated to a film 501 is preferred because typically the stretchable fabric will cease to stretch before the film is stretched to the point of damaging its structural integrity. This permits the bladder to be flexible and stretched, but does not result in damage to the film during such stretching, even when the bladder is placed under a great amount of stress or pressure.

The layers of the flexible bladder may be any desired thickness. In a preferred embodiment of the invention, a layer of the bladder is a film of from about 0.003 to about 0.030 inches in thickness, and in a more preferred embodiment, a layer of film is less than about 0.020 inches in thickness. In the most preferred embodiment of the invention, the layer of film is about 0.001 to 0.006 inches in thickness to provide sufficient flexibility while remaining fluid-tight. The preferred stretchable fabric is a meltable thermoplastic so that it can be heat welded to a thermoplastic film, if desired.

The bladder may be filled with the composite mixture by removing air from the bladder and injecting the composite mixture, thereby preventing any gross air bubbles from being present in the bladder. The bladder should only be partially filled with composite mixture to permit movement of the mixture and to achieve the desired cushioning properties. The volume of composite mixture in the bladder may be increased to provide a stiffer cushion or decreased to provide a more flowable cushion as per physician or physical therapist recommendations for a particular patient.

It would be contrary to the objects of the invention to fill the bladder more than 80% full with composite mixture because the flow and shear characteristics of the composite mixture would be impaired. Also, no gross air bubbles should be included in the finished product or the performance of the device will be reduced. In most embodiments of the invention, not more than 80% of the maximum volume of the bladder is filled with composite mixture, although completely full or nearly empty bladders could be envisioned. On average, bladders are expected to be about 30% to 50% filled by volume with composite mixture.

In the preferred embodiments of the visco-elastic fluid of the invention, the composite mixture shears more easily than and equalizes pressure better than prior art cushioning gels, but weighs only 20% to 50% as much. Various other preferred embodiments of the invention have higher specific gravities, some being up to and above 0.50 and some being less than 0.2. Achieving a low shear force relies on achieving a low coefficient of friction between the spherical objects such as by using a highly lubricious lubricant and spherical objects with very smooth exteriors. In practice, nearly any lubricant can be used and any type of spherical object can be used, made of almost any material, hollow or otherwise and of nearly any size.

The best mode of the invention includes a highly lubricious, visco-elastic lubricant which serves to lubricate a quantity of plastic microspheres contained within a multi-layer bladder that has at least one layer that is a fabric-coated film. The particular composite mixture which the Applicant contemplates as a best mode is a mixture of a lubricious, visco-elastic lubricant comprising about 99.3 weight percent white mineral oil USP grade sold under the trade name of SUPERLA White Mineral Oil No. 21 by Amoco Corporation of Chicago, Ill. and either KRATON G 1651 (Shell Chemical Company, Houston, Tex.) (poly (styrene-ethylene/butylene-styrene)) or SEPTON 8006 (Kuraray Co. Ltd., Isoprene Chemicals Division, Tokyo, Japan) (poly(styrene-ethylene/butylene-styrene)). The composite mixture further comprises acrylic microscopic spherical objects (PM 6545 from PQ Corporation of Valley Forge, Pa.), which results in a specific gravity for the composite mixture of about between about 0.36 to about 0.06, or less. The spherical objects are acrylic plastic-walled microspheres in the 10–200 micron diameter range and having a uniform wall thickness and having spherical configuration. These microspheres have a specific gravity of about 0.02, and an elastic characteristic, such that the microspheres can be compressed to less than 20% of their original volume and rebound to about 100% of their original volume when the compressive force is removed. These microspheres are also resistant to a pressure of about 2,000 psi without rupturing.

In one preferred embodiment of the invention, preparation of the composite mixture is performed simply by placing the lubricant and spherical objects in a container and mixing until the spheres are reasonably uniformly coated with lubricant. No special preparation steps are required, and the ingredients can be mixed at ambient temperature.

In the most preferred embodiment in which the lubricant includes a visco-elastic fluid, the principle molecule and cross-linking agent are pre-mixed. A preservative may be included at this time. The mixture is then allowed to reversibly cross-link for about two to three days. Constant slow stirring during the cross-linking period, particularly the first half-day, is helpful to promote complete mixing and to prevent stratification of the mixture. When bond formation is near completion, the lubricant is highly lubricious. For purposes of this disclosure, a material is defined as "lubricious" if it tends to reduce the coefficient of friction between two objects. In this preferred embodiment, bond-formation is essentially complete when, after grasping a "handful" of the lubricant, most of the lubricant can be moved "en mass." In other words, a person can grasp a handful of the lubricant, pull very quickly, and a large portion of the lubricant which was not grabbed but which is cross-linked to that which was grabbed will travel with the grabbed handful.

The microspheres are then mixed with the lubricant until the microspheres are reasonably uniformly coated. No special preparation steps are required, and the ingredients can be mixed at ambient temperature.

In the best mode of making the visco-elastic fluid, the white mineral oil is heated to about 355° F. or higher, and then elastomeric polymer is added. Heating is continued until the elastomeric polymer is melted. The mineral oil/polymer mixture may be agitated to suspend the polymer and to promote mixing of the polymer with the oil. Generally, heating for about 4 hours is sufficient to form the visco-elastic fluid, although shorter or longer times are also with the scope of the invention.

An example of the best mode of making the composite mixture is as follows. Fifty-five (55) gallons of mineral oil is heated with agitation until the oil temperature nears 350° F. During the heating process, 13 grams of an anti-oxidant (e.g. Irganox 1010, Ciba-Geigy Corporation, Hawthorne, N.Y.) is sprinkled into the oil while the oil is agitated. When the oil temperature reaches about 350° F., 610 grams (by weight) of cross-linking agent (e.g. Kraton G 1651) is sprinkled into the heated oil, making sure that any lumps are dispersed. A second aliquot of 610 grams of cross-linking agent is added when the oil temperature reaches about 355° F. Heating continues until the oil temperature reaches 365° F. The temperature is held at 365° F. for about four (4) hours with continued agitation. Afterwards, the visco-elastic fluid is drained into a cooling/holding tank.

After the visco-elastic fluid has cooled, microspheres are added to the fluid. For example, three gallons of visco-elastic fluid may be added per one (1) kilogram of PM 6545 microspheres to make a composite mixture having a specific gravity of about 0.12. The visco-elastic fluid/microsphere mixture is mixed in a tumbler for 45 minutes to one hour. These examples are intended to be only illustrative of the best mode of making the composite mixture. The scope of the invention is indicated by the appended claims, rather than by the foregoing description and examples.

The particular flexible bladder which the Applicant contemplates as a best mode includes a laminated LYCRA stretch-knit polyamide/polyurethane material and a layer of polyurethane film disposed on either side of the composite mixture. Such a flexible bladder may be formed by placing two extra layers of a polyurethane film on the polyurethane side of a piece of laminated material. The polyurethane side of a second extra layer of laminated material is placed into contact with the polyurethane film. The layers of laminated material and extra polyurethane are then welded together by radio frequency welding, and the lubricated sphere mixture is placed between the two extra polyurethane film layers. The extra layers of film strengthen the weld.

The preferred composite mixture used with the invention is a material which has many of the same beneficial physical properties as fluids used in cushioning, but absent the numerous disadvantages of prior art fluids. For example, the composite mixture has a low specific gravity and hence is lightweight, has little or no memory, a low shearing force threshold, a low thermal mass and low coefficient of heat transfer, little to no variation in performance over broad temperature ranges, resistance to degradation over time, the mixture relatively evenly distributes pressure over the contact surface area of an object being cushioned, and the mixture has a specific gravity low enough to make it useful for use in flotation devices. The composite mixture is not a mere fluid as found in the prior art. The lubricant is used to reduce the coefficient of friction of the outside surface of the spherical objects (i.e., make them slick), allowing desired sliding and rolling movement between spherical objects but does not serve as a dispersing liquid for the spherical objects. Because lubricants are available that do not break down over time, because microspheres are available that are chemically inert (e.g., glass or acrylic microspheres), and because the preferred lubricant has a great affinity for itself and does not tend to migrate through bladders, a composite mixture can be made such that it lasts indefinitely without change in its properties and can be successfully contained within a cushioning object. The preferred composite mixture used with the invention has a lower coefficient of heat transfer than prior art cushioning fluids because the majority of the volume is microspheres and because the interior of the microspheres used in the preferred embodiment have trapped gaseous internal atmospheres, and trapped gas acts as an excellent insulator. As a result, the composite mixture of the invention does not feel as cold to the body that is being cushioned as do cushions using prior art fluids. A low coefficient of heat transfer, such as less than 0.25 btu per hour per foot per degree Fahrenheit is provided in the preferred composite mixture in the puff-quilt of the invention. A low coefficient of thermal mass, less than 0.7 calories per cubic centimeter per degree Celsius, is also provided in the preferred composite mixture in the puff-quilt of the invention.

A very important advantage of the invention is that it provides substantially even distribution of pressure across the contact area of the object being cushioned. This is because the use of the composite mixture within a partially-filled flexible bladder permits the composite mixture to accommodate object protrusions and flow and fill object depressions. As the composite mixture flows to contact as much area of the object as possible, pressure across the contact area of the object is substantially equalized.

Another important advantage of the preferred composite mixture is that when used as a filler material for the invented puff-quilts, the composite mixture has no memory, no head pressure (i.e. no gravity flow) readily flows under pressure and readily shears to reduce skin stresses. It also readily conforms to the shape of the body part being cushioned, maximizes the cushioning surface area, and rapidly adjusts when the user moves the body part being cushioned. Additional advantageous features include non-toxicity of the composite mixture, resistance to evaporation in some embodiments and a non-staining composite mixture. The result is a safe and pressure-equalizing cushion.

The most preferred bladder material of the invention is a four layer polyurethane film and laminated lycra/polyurethane. The multi-layer laminate is very tough and the sew-through-the-weld-to-the-base would be accordingly very tough. However, single or multiple layers of polyurethane, PVC (vinyl), or any other weldable film can be used in the invention.

The preferred base can be any relatively non-stretch fabric, film, plastic sheet, or other material to which the bladder may be attached. Nylon cordura is most preferred because it is relatively non-stretch, relatively inexpensive, easily sewn through, and very durable.

The preferred flowable cushioning medium is a composite mixture of lubricated microspheres, although other flowable materials including fluids may be used. Air or other inert gases may also be used as the flowable cushioning medium, although in some applications they are not preferred because of the instability which will occur during shifting of the cushioned object. When the preferred composite mixture is used, a stable cushion results.

C. Method for Making the Puff-Quilt

The bladders of the preferred embodiment are made by laying flat films (or flat laminates of fabric/film) atop one another and applying pressure in combination with an energy source at the locations that are to be welded (perimeter weld, spot weld, bladder dividing weld, etc.). The energy source most preferred for the most preferred bladder materials consists of radio frequency waves ("radio frequency welding"). The second most preferred consists of ultra-sonic waves ("ultra-sonic welding"). The third most preferred consists of heat ("heat sealing"). However, any source of energy used to join the layers is intended to be comprehended within the scope of this invention.

After the bladder of the preferred embodiment is welded, it is partially filled with a measured amount of fluid, any air is expelled (unless air is being used as the flowable cushioning medium), and the fill port is sealed shut via the welding processes of the above paragraph.

The base of the preferred embodiment is then marked in a pattern that matches, on a smaller scale, the welds of the larger bladder which will be sewn through. The sewing of the welds to the marks then takes place, with tacking methods well known in the sewing art. In some cases, the fabric outside the periphery weld will be sewn to the base as well.

Other notable characteristics of the finished product which contribute toward achieving the objects of the invention include the following: (1) The preferred four-ply laminate of polyurethane and Lycra form an extremely durable material at the weld area, from which it would be very difficult to pull out the threads used to sew the bladder to its base. (2) The preferred bladder materials are supple and pliable. (3) The preferred bladder materials will fully contain the preferred fluid over a long period of time.

Cushions can be made with the puff-quilted bladders for any number of applications, including wheelchair seats, wheelchair backs, bicycle seats, automobile seats, stadium seats, saddles, secretarial chairs, executive chairs, lounge chairs, lumbar supports, and others. Other applications for the puff-quilted bladders include mattress tops for conventional mattresses, fill material for waterbed-type mattresses, and cushioning pads for hospital beds.

While the present invention has been described and illustrated in conjunction with a number of specific embodiments, those skilled in the art will appreciate that variations and modifications may be made without departing from the principles of the invention as herein illustrated, described and claimed. The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

I claim:

1. A cushioning device comprising:
   a) a bladder which is flat prior to filling, said bladder comprising:
      i) a first film;
      ii) a second film welded to said first film with an edge weld to form a sealed compartment, and welded with spot welds to said first film at selected interior locations of said sealed compartment; and
      iii) a quantity of flowable cushioning medium which is contained in and partially fills said sealed compartment; and
   b) a non-stretchable base which is smaller in size than said bladder in at least one dimension;
   wherein said selected interior locations are permanently attached to corresponding interior locations in said smaller base.

2. A cushioning device in accordance with claim 1, wherein at least a portion of the edge of said bladder is permanently attached to the edge of said base.

3. A cushioning device in accordance with claim 1
   wherein a plurality of said spot welds at said selected interior locations are circular;
   wherein said bladder has spot welds along said edge weld;
   wherein said spot welds which are located on approximately linear portions of said edge weld are half-circles and said spot welds which are located on corners of said edge weld are quarter-circles.

4. A cushioning device in accordance with claim 1, wherein a plurality of said spot welds at said selected interior locations are spaced uniformly in the interior of said sealed compartment.

5. A cushioning device in accordance with claim 1, wherein said base is between about 5% and about 95% smaller than said bladder in at least one dimension.

6. A cushioning device in accordance with claim 1, wherein said base is between about 30% and about 70% smaller than said bladder in at least one dimension.

7. A cushioning device in accordance with claim 1, wherein said bladder is filled to between about 25% and about 50% of its capacity.

8. A cushioning device in accordance with claim 1, wherein said flowable cushioning medium is able to flow freely through a portion of said bladder between said spot welds.

9. A cushioning device in accordance with claim 1, wherein said first film and said second film are each made of a material selected from the group consisting of polyurethane/stretch-knit polyamide laminates, polyurethane, vinyl, polyvinyl chloride, latex, rubber, synthetic rubber, thermoplastic elastomers and EVAs.

10. A cushioning device in accordance with claim 1, wherein said first film and said second film are made of a laminate of polyurethane and stretch-knit polyamide.

11. A cushioning device in accordance with claim 1, wherein said base is made of a material selected from the group consisting of nylon cordura fabric, vinyl film and polyurethane film.

12. A cushioning device in accordance with claim 1, wherein attachment of said bladder to said base comprises stitching through a plurality of said spot welds.

13. A cushioning device in accordance with claim 1, wherein attachment of said bladder to said base comprises stitching a portion of said edge weld to said base.

14. A cushioning device in accordance with claim 1, wherein attachment of said bladder to said base comprises stitching to said base a portion of bladder film located, with respect to said sealed compartment, distal to said edge weld.

15. A cushioning device in accordance with claim 1, wherein attachment of said bladder to said base comprises placing rivets through said spot welds.

16. A cushioning device in accordance with claim 1, wherein said flowable cushioning medium is selected from the group consisting of inert gas, air, liquids, gels, oils, microspheres coated with lubricant, and elastic particles in a thermoplastic bonding agent.

17. A cushioning device in accordance with claim 1, wherein said flowable cushioning medium comprises:
   (a) a plurality of spherical objects and
   (b) a quantity of lubricant on the exterior surface of substantially all of said spherical objects, said lubricant comprising a principle molecule and an elastomeric polymer, said lubricant being present in a quantity less than would cause dispersion of said spherical objects in said lubricant sufficient such that said spherical objects would be significantly separated from each other by said lubricant;
   wherein said spherical objects and said lubricant are mixed together to form the composite mixture;
   wherein said lubricant is lubricious and serves to reduce the coefficient of friction between contacting spherical objects;
   wherein said spherical objects within said mixture are movable in low-friction sliding and rolling contact with each other in all three dimensions;
   wherein the composite mixture flows and shears in response to a deforming pressure exerted on it, said flow and shear being accomplished by said spherical objects moving in rolling and sliding contact with each other; and
   wherein the composite mixture ceases to flow and shear when the deforming pressure is terminated.

18. A cushioning device in accordance with claim 17, wherein said principle molecule of said flowable cushioning medium is white mineral oil.

19. A cushioning device in accordance with claim 17, wherein said elastomeric polymer of said flowable cushioning medium is selected from the group consisting of poly(styrene-ethylene/butylene-styrene), poly(styrene-hydrogenated isoprene-styrene), poly(styrene-hydrogenated butadiene-styrene) and poly(styrene-hydrogenated (isoprene+butadiene)-styrene).

20. A cushioning device in accordance with claim 1, wherein said flowable cushioning medium comprises:
 a) a plurality of microspheres, and
 b) a quantity of visco-elastic fluid on the exterior surface of substantially all of said microspheres, said visco-elastic fluid comprising a principle molecule and an elastomeric polymer, said visco-elastic fluid being present in a quantity less than would cause dispersion of said microspheres in said visco-elastic fluid sufficient such that said microspheres objects would be significantly separated from each other by said visco-elastic fluid; and
 wherein said microspheres are movable in low-friction sliding and rolling contact with each other in all three dimensions.

21. A cushioning device in accordance with claim 20, wherein said principle molecule of said flowable cushioning medium is white mineral oil.

22. A cushioning device in accordance with claim 20, wherein said elastomeric polymer of said flowable cushioning medium is selected from the group consisting of poly(styrene-ethylene/butylene-styrene), poly(styrene-hydrogenated isoprene-styrene), poly(styrene-hydrogenated butadiene-styrene) and poly(styrene-hydrogenated (isoprene+butadiene)-styrene).

23. A cushioning device in accordance with claim 1, wherein said flowable cushioning medium comprises:
 a) a plurality of spherical objects and
 b) a quantity of visco-elastic fluid on the exterior surface of substantially all of said spherical objects, said visco-elastic fluid being present in a quantity less than would cause dispersion of said spherical objects in said visco-elastic fluid sufficient such that said spherical objects would be separated from each other by more than a thin film of said visco-elastic fluid, and said visco-elastic comprising a principle molecule and an elastomeric polymer;
 wherein said visco-elastic fluid comprises a mixture of molecules which are reversibly cross-linked, such that the linkages are easily sheared by a slow mechanical force, and such that new linkages may be reestablished among the molecules of the mixture following cessation of the mechanical force.

24. A cushioning device in accordance with claim 23, wherein said principle molecule of said flowable cushioning medium is white mineral oil.

25. A cushioning device in accordance with claim 23, wherein said elastomeric polymer of said flowable cushioning medium is selected from the group consisting of poly(styrene-ethylene/butylene-styrene), poly(styrene-hydrogenated isoprene-styrene), poly(styrene-hydrogenated butadiene-styrene) and poly(styrene-hydrogenated (isoprene+butadiene)-styrene).

26. A cushioning device comprising:
 a) a flat bladder, said bladder comprising:
  i) a first film of laminated polyurethane and stretch-knit polyamide;
  ii) a second film of laminated polyurethane and stretch-knit polyamide welded to said first film with an edge weld to form a sealed compartment and welded with spot welds to said first film at selected interior locations of said sealed compartment; and
  iii) a quantity of flowable cushioning medium which is contained in and fills said sealed compartment to between about 25 and about 50 percent of its capacity; and
 b) a non-stretch fabric base which is between about 20 percent and about 70 percent smaller in size than said bladder in at least one dimension;
 wherein said flowable cushioning medium comprises a mixture of hollow microspheres coated with a lubricant;
 wherein at least a portion of the edge of said flat bladder is stitched to said base; and
 wherein said selected interior locations are stitched to corresponding interior locations in said base through said spot welds.

27. A cushioning device comprising:
 a) a flat bladder, said bladder comprising:
  i) a first film;
  ii) a second film, wherein said second film is welded to said first film along its edge with an edge weld thereby forming a sealed compartment, said second film also being welded to said first film along one or more strips passing through the interior of said sealed compartment thereby subdividing said sealed compartment into a plurality of sealed compartments, and wherein said second film is spot welded to said first film at selected interior locations of at least one of said sealed compartments; and
  iii) within each of said several sealed compartments, a quantity of flowable cushioning medium which is contained in and at least partially fills a plurality of said several sealed compartments; and
 b) a non-stretchable base which is smaller in size than said bladder in at least one dimension;
 wherein said selected interior locations are permanently attached to corresponding interior locations in said base.

28. A cushioning device as recited in claim 27 wherein at least a portion of the edge of said bladder is permanently attached to the edge of said base.

29. A method for manufacturing a cushioning device, comprising the steps of:
 a) welding a first film and a second film together at their edges with an edge weld to form a flat bladder;
 b) welding said first film and said second film together at selected locations in the interior of said bladder with spot welds;
 c) filling said bladder to at least a portion of its capacity with a flowable cushioning medium;
 d) permanently attaching a plurality of said spot welds to a flexible, non-stretchable fabric base;
 wherein the boundary of said base is smaller than said bladder in at least one dimension; and
 wherein attaching said spot welds to said base causes said bladder to wrinkle.

30. A method in accordance with claim 29, wherein step d) comprises sewing said spot welds to said base.

31. A method in accordance with claim 29, wherein step d) comprises welding said spot welds to said base.

32. A method in accordance with claim 29, wherein step d) comprises riveting said spot welds to said base.

33. A method in accordance with claim 29, wherein the energy source used for producing said edge weld and said spot welds is selected from the group consisting of radio frequency energy, ultrasonic waves, and heat.

34. A cushion comprising:
   a) a first bladder wall, said first bladder wall having a perimeter and an inner portion,
   b) a second bladder wall, said second bladder wall having a perimeter and an inner portion, said second bladder wall perimeter being attached to said first bladder wall perimeter to form a bladder that is capable of containing a flowable cushioning medium,
   c) a plurality of attachments attaching selected locations of said inner portion of said first bladder wall to said inner portions of said second bladder wall in order to create open compartments within said bladder,
   d) a quantity of flowable cushioning medium located within said bladder, the quantity of said flowable cushioning medium being insufficient to completely fill the interior volumetric capacity of said bladder, and
   e) a base permanently attached to said second bladder wall, said base being of a size that is less than the size of said bladder and said base being attached to said second bladder wall at a plurality of said attachments;
   wherein said flowable cushioning medium is flowable under pressure among said open compartments.

35. A cushion as recited in claim 34
   wherein said base and said bladder are of the same general shape;
   wherein said base has a perimeter and an outer portion; and
   wherein said base perimeter is attached to said second bladder wall.

36. A cushion as recited in claim 34
   wherein said bladder has numerous random folds and creases on its surface resulting from a loose first bladder wall.

37. A cushion as recited in claim 34
   wherein said cushion is capable of conforming to the shape of an object placed on the cushion so that as the object to be cushioned rests on the first bladder wall, the first bladder wall forms a hammock in which the cushioned object rests.

38. A cushion as recited in claim 34
   wherein said base comprises a substantially non-stretchable fabric.

39. A cushion as recited in claim 34 wherein said flowable cushioning medium comprises:
   i) a plurality of spherical objects and
   ii) a quantity of lubricant on the exterior surface of substantially all of said spherical objects, said lubricant being present in a quantity less than would cause dispersion of said spherical objects in said lubricant sufficient such that said spherical objects are significantly separated from each other by said lubricant;
   wherein said spherical objects and said lubricant are mixed together to form the composite mixture;
   wherein said lubricant is lubricious, serves to reduce the coefficient of friction between contacting spherical objects, and does not prevent sliding and rolling of said spherical objects with respect to each other;
   wherein said spherical objects within said mixture are movable in low-friction sliding and rolling contact with each other in all three dimensions;
   wherein the composite mixture flows and shears in response to a deforming pressure exerted on it, said flow and shear being accomplished by said spherical objects moving in rolling and sliding contact with each other; and
   wherein the composite mixture ceases to flow and shear when the deforming pressure is terminated.

40. A cushion as recited in claim 34 wherein said flowable cushioning medium comprises a quantity of microspheres that have a light coating of lubricant on their exterior surfaces.

41. A cushion as recited in claim 34 wherein said flowable cushioning medium is a composite mixture that comprises:
   i) a plurality of microspheres and
   ii) a quantity of visco-elastic fluid on the exterior surface of substantially all of said microspheres, said visco-elastic fluid being present in a quantity less than would cause dispersion of said microspheres in said visco-elastic fluid sufficient such that said microspheres objects would be significantly separated from each other by said visco-elastic fluid;
   wherein said microspheres are movable in low-friction sliding and rolling contact with each other in all three dimensions;
   wherein the composite mixture flows and shears in response to a deforming pressure exerted on it, said flow and shear being accomplished by said spherical objects moving in rolling and sliding contact with each other; and
   wherein the composite mixture ceases to flow and shear when the deforming pressure is terminated.

42. A cushion as recited in claim 41 wherein said visco-elastic fluid comprises a principle molecule and a cross-linking agent.

43. A cushion as recited in claim 42 wherein said principle molecule is white mineral oil.

44. A cushion as recited in claim 42 wherein said cross-linking agent is selected from the group consisting of poly(styrene-ethylene/butylene-styrene), poly(styrene-hydrogenated isoprene-styrene), poly(styrene-hydrogenated butadiene-styrene) and poly(styrene-hydrogenated (isoprene+butadiene)-styrene).

45. A cushion as recited in claim 42 wherein said visco-elastic fluid comprises about 99.3 weight percent white mineral oil and about 0.07 weight percent poly(styrene-ethylene/butylene-styrene) cross-linking agent, said weight percentages being based on the total weight of the visco-elastic fluid.

46. A cushion as recited in claim 34 wherein said flowable cushioning medium is a composite mixture comprising:
   spherical objects comprising an outer shell and an inert atmosphere sealed within the outer shell, said spherical objects being less than 2000 microns in diameter, and
   lubricant comprising a principle molecule and a cross-linking agent;
   wherein said lubricant is lubricious, serves to reduce the coefficient of friction between contacting spherical objects, and does not prevent sliding and rolling of said spherical with respect to each other;
   wherein said lubricant is present on the exterior surface of essentially all of said spherical objects, but in a quantity less than would cause dispersion of said spherical objects in said lubricant sufficient to significantly physically separate said spherical objects from each other such that more than a thin film of lubricant is interposed between spherical objects and preventing the sliding and rolling contact of said spherical objects with each other;

wherein said spherical objects and said lubricating means are mixed together to form the composite mixture;

wherein said spherical objects within said mixture are movable in low-friction sliding and rolling contact with each other in all three dimensions;

wherein said composite mixture exhibits little memory for shape;

wherein said spherical objects are made from material selected from the group consisting of plastic, glass, metal, carbon, mineral, and quartz;

wherein said lubricant maintains lubriciousness with changes in temperature;

wherein said composite mixture has a low thermal mass and a low coefficient of heat transfer;

wherein the composite mixture flows and shears in response to a deforming pressure exerted on it, said flow and shear being accomplished by said spherical objects moving in rolling and sliding contact with each other;

wherein said composite mixture has a low shearing force threshold when rapidly sheared; and wherein said composite mixture resists separating into its constituent components over time.

47. A cushion as recited in claim 34 wherein said flowable cushioning medium is a composite mixture comprising:

a) a plurality of spherical objects and b) a quantity of visco-elastic fluid on the exterior surface of substantially all of said spherical objects, said visco-elastic fluid being present in a quantity less than would cause dispersion of said spherical objects in said visco-elastic fluid sufficient such that said spherical objects would be separated from each other by more than a thin film of said visco-elastic fluid, and said visco-elastic comprising a principle molecule and a gelling agent;

wherein said visco-elastic fluid comprises a mixture of molecules which are reversibly cross-linked, such that the linkages are easily sheared by a slow mechanical force, and such that new linkages may be reestablished among the molecules of the mixture following cessation of the mechanical force.

48. A cushioning device comprising:

a) a first bladder wall, said first bladder wall having a perimeter and an inner portion, b) a second bladder wall, said second bladder wall having a perimeter and an inner portion, said second bladder wall perimeter being attached to said first bladder wall perimeter to form a bladder that is capable of containing a flowable cushioning medium, c) a plurality of attachments attaching selected locations of said inner portion of said first bladder wall to said inner portions of said second bladder wall in order to create open compartments within said bladder, d) a quantity of flowable cushioning medium located within said bladder, the quantity of said flowable cushioning medium being insufficient to completely fill the interior volumetric capacity of said bladder, said flowable cushioning medium comprising lubricated spherical objects, and e) a base permanently attached to said second bladder wall, said base being of a size that is less than the size of said bladder in at least one dimension and said base being attached to said second bladder wall at a plurality of said attachments;

wherein said flowable cushioning medium is flowable under pressure among said open compartments.

49. A cushioning device comprising:

(a) a bladder having:

(i) a sealing membrane formed into a sealed compartment, the sealed compartment having a top and a bottom, the top being attached to the bottom at a plurality of locations; and (ii) a quantity of cushioning medium which is contained in said sealed compartment, the quantity of cushioning medium being less than that which would completely fill said compartment; and (b) a base attached to said bladder;

wherein a plurality of attachments are spaced uniformly in the interior of said sealed compartment.

50. A cushioning device in accordance with claim 49, wherein said sealing membrane is made of a material selected from the group consisting of polyurethane/stretch-knit polyamide laminates, polyurethane, vinyl, polyvinyl chloride, latex, rubber, synthetic rubber, thermoplastic elastomers and EVAs.

51. A cushioning device comprising:

(a) a bladder having:

(i) a sealing membrane formed into a sealed compartment, the sealed compartment having a top and a bottom, the top being attached to the bottom at a plurality of locations; and (ii) a quantity of cushioning medium which is contained in said sealed compartment, the quantity of cushioning medium being less than that which would completely fill said compartment; and (b) a base attached to said bladder;

wherein said base is smaller than said bladder in at least one dimension.

52. A cushioning device in accordance with claim 51, wherein said bladder is filled to between about 25% and 50% of its capacity.

53. A cushioning device in accordance with claim 51, wherein said cushioning medium is flowable.

54. A cushioning device in accordance with claim 53, wherein said principle molecule of said flowable cushioning medium is white mineral oil.

55. A cushioning device in accordance with claim 53, wherein said elastomeric polymer of said flowable cushioning medium is selected from the group consisting of poly (styrene-ethylene/butylene-styrene), poly(styrene-hydrogenated isoprene-styrene), poly(styrene-hydrogenated butadiene-styrene) and poly(styrene-hydrogenated (isoprene+butadiene)-styrene).

56. A cushioning device comprising:

(a) a bladder having:

(i) a sealing membrane formed into a sealed compartment, the sealed compartment having a top and a bottom, the top being attached to the bottom at a plurality of locations; and (ii) a quantity of cushioning medium which is contained in said sealed compartment, the quantity of cushioning medium being less than that which would completely fill said compartment; and (b) a base attached to said bladder;

wherein said base is between 5% and 95% smaller than said bladder in at least one dimension.

57. A cushioning device comprising:

(a) a bladder having:

(i) a sealing membrane formed into a sealed compartment, the sealed compartment having a top and a bottom, the top being attached to the bottom at a plurality of locations; and

27

(ii) a quantity of cushioning medium which is contained in said sealed compartment, the quantity of cushioning medium being less than that which would completely fill said compartment; and (b) a base attached to said bladder;

wherein said base is between 30% and 70% smaller than said bladder in at least one dimension.

58. A cushioning device comprising:

(a) a bladder having:
  (i) a sealing membrane formed into a sealed compartment, the sealed compartment having a top and a bottom, the top being attached to the bottom at a plurality of locations; and
  (ii) a quantity of cushioning medium which is contained in said sealed compartment, the quantity of cushioning medium being less than that which would completely fill said compartment; and (b) a base attached to said bladder;

wherein said cushioning medium is flowable; and wherein said cushioning medium is able to flow freely through a portion of said bladder between said attachments.

59. A cushioning device in accordance with claim 58, wherein said flowable cushioning medium comprises:
  a) a plurality of microspheres, and
  b) a quantity of visco-elastic fluid on the exterior surface of substantially all of said microspheres, said visco-elastic fluid comprising a principle molecule and an elastomeric polymer, said visco-elastic fluid being present in a quantity less than would cause dispersion of said microspheres in said visco-elastic fluid sufficient such that said microspheres objects would be significantly separated from each other by said visco-elastic fluid; and wherein said microspheres are movable in low-friction sliding and rolling contact with each other in all three dimensions.

60. A cushioning device in accordance with claim 59, wherein said principle molecule of said flowable cushioning medium is white mineral oil.

61. A cushioning device in accordance with claim 59, wherein said elastomeric polymer of said flowable cushioning medium is selected from the group consisting of poly (styrene-ethylene/butylene-styrene), poly(styrene-hydrogenated isoprene-styrene), poly(styrene-hydrogenated butadiene-styrene) and poly(styrene-hydrogenated (isoprene+butadiene)-styrene).

62. A cushioning device in accordance with claim 58 wherein said flowable cushioning medium comprises:
  a) a plurality of spherical objects and
  b) a quantity of visco-elastic fluid on the exterior surface of substantially all of said spherical objects, said visco-elastic fluid being present in a quantity less than would cause dispersion of said spherical objects in said visco-elastic fluid sufficient such that said spherical objects would be separated from each other by more than a thin film of said visco-elastic fluid, and said visco-elastic comprising a principle molecule and an elastomeric polymer;

wherein said visco-elastic fluid comprises a mixture of molecules which are reversibly cross-linked, such that the linkages are easily sheared by a slow mechanical force, and such that new linkages may be reestablished among the molecules of the mixture following cessation of the mechanical force.

63. A cushioning device in accordance with claim 62, wherein said elastomeric polymer of said flowable cushioning medium is selected from the group consisting of poly (styrene-ethylene/butylene-styrene), poly(styrene-hydrogenated isoprene-styrene), poly(styrene-hydrogenated butadiene-styrene) and poly(styrene-hydrogenated (isoprene+butadiene)-styrene).

64. A cushioning device in accordance with claim 62, wherein said principle molecule of said flowable cushioning medium is white mineral oil.

65. A cushioning device comprising:

(a) a bladder having:
  (i) a sealing membrane formed into a sealed compartment, the sealed compartment having a top and a bottom, the top being attached to the bottom at a plurality of locations; and
  (ii) a quantity of cushioning medium which is contained in said sealed compartment, the quantity of cushioning medium being less than that which would completely fill said compartment; and (b) a base attached to said bladder;

wherein attachment of said bladder to said base comprises stitching through a plurality of said sealing membrane attachments.

66. A cushion as recited in claim 51 wherein said visco-elastic fluid comprises a principle molecule and a cross-linking agent.

67. A cushion as recited in claim 66 wherein said principle molecule is white mineral oil.

68. A cushion as recited in claim 66 wherein said cross-linking agent is selected from the group consisting of poly(styrene-ethylene/butylene-styrene), poly(styrene-hydrogenated isoprene-styrene), poly(styrene-hydrogenated butadiene-styrene) and poly(styrene-hydrogenated (isoprene+butadiene)-styrene).

69. A cushion as recited in claim 66 wherein said visco-elastic fluid comprises about 99.7 weight percent white mineral oil and about 0.007 weight percent poly(styrene-ethylene/butylene-styrene) cross-linking agent, said weight percentages being based on the total weight of the visco-elastic fluid.

70. A cushioning device comprising:

(a) a bladder having:
  (i) a sealing membrane formed into a sealed compartment, the sealed compartment having a top and a bottom, the top being attached to the bottom at a plurality of locations; and
  (ii) a quantity of cushioning medium which is contained in said sealed compartment, the quantity of cushioning medium being less than that which would completely fill said compartment; and (b) a base attached to said bladder;

wherein said sealing membrane is made of a laminate of polyurethane and stretch-knit polyamide.

71. A cushioning device comprising:

(a) a bladder having:
  (i) a sealing membrane formed into a sealed compartment, the sealed compartment having a top and a bottom, the top being attached to the bottom at a plurality of locations; and
  (ii) a quantity of cushioning medium which is contained in said sealed compartment, the quantity of cushioning medium being less than that which would completely fill said compartment; and (b) a base attached to said bladder;

wherein said base is made of a material selected from the group consisting of nylon cordura fabric, vinyl film and polyurethane film.

72. A cushioning device comprising:
(a) a bladder having:
   (i) a sealing membrane formed into a sealed compartment, the sealed compartment having a top and a bottom, the top being attached to the bottom at a plurality of locations; and
   (ii) a quantity of cushioning medium which is contained in said sealed compartment, the quantity of cushioning medium being less than that which would completely fill said compartment; and
(b) a base attached to said bladder;
wherein attachment of said bladder to said base comprises stitching a portion of the edge of said bladder to said base.

73. A cushioning device comprising:
(a) a bladder having:
   (i) a sealing membrane formed into a sealed compartment, the sealed compartment having a top and a bottom, the top being attached to the bottom at a plurality of locations; and
   (ii) a quantity of cushioning medium which is contained in said sealed compartment, the quantity of cushioning medium being less than that which would completely fill said compartment; and
(b) a base attached to said bladder;
wherein attachment of said bladder to said base comprises stitching to said base a portion of sealing membrane located, with respect to said sealed compartment, distal to the edge of said bladder.

74. A cushioning device comprising:
(a) a bladder having:
   (i) a sealing membrane formed into a sealed compartment, the sealed compartment having a top and a bottom, the top being attached to the bottom at a plurality of locations; and
   (ii) a quantity of cushioning medium which is contained in said sealed compartment, the quantity of cushioning medium being less than that which would completely fill said compartment; and
(b) a base attached to said bladder;
wherein attachment of said bladder to said base comprises placing rivets through said sealing membrane attachments.

75. A cushioning device in accordance with claim 51, wherein said cushioning medium is selected from the group consisting of inert gas, air, liquids, gels, oils, microspheres coated with lubricant, and elastic particles in a thermoplastic bonding agent.

76. A cushion as recited in claim 58 wherein said flowable cushioning medium is a composite mixture that comprises:
   i) a plurality of microspheres and
   ii) a quantity of visco-elastic fluid on the exterior surface of substantially all of said microspheres, said visco-elastic fluid being present in a quantity less than would cause dispersion of said microspheres in said visco-elastic fluid sufficient such that said microspheres objects would be significantly separated from each other by said visco-elastic fluid;
   wherein said microspheres are movable in low-friction sliding and rolling contact with each other in all three dimensions;
   wherein the composite mixture flows and shears in response to a deforming pressure exerted on it, said flow and shear being accomplished by said spherical objects moving in rolling and sliding contact with each other; and
   wherein the composite mixture ceases to flow and shear when the deforming pressure is terminated.

* * * * *